(12) United States Patent
Tezuka et al.

(10) Patent No.: US 7,239,427 B2
(45) Date of Patent: Jul. 3, 2007

(54) METHOD OF MAKING CORRECTION FOR COLOR SENSOR OUTPUT VALUES IN COLOR IMAGE FORMING APPARATUS, AND COLOR IMAGE FORMING APPARATUS

(75) Inventors: Hiroki Tezuka, Kanagawa (JP); Yoichiro Maebashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 962 days.

(21) Appl. No.: 10/285,566

(22) Filed: Nov. 1, 2002

(65) Prior Publication Data

US 2003/0090693 A1    May 15, 2003

(30) Foreign Application Priority Data

Nov. 9, 2001    (JP)    ............................. 2001-344916

(51) Int. Cl.
*H04N 1/40*    (2006.01)
(52) U.S. Cl. ........................................ 358/2.1; 358/504
(58) Field of Classification Search ................ 358/2.1, 358/1.9, 1.15–1.17, 504, 406; 399/49–51, 399/58–62
See application file for complete search history.

(56) References Cited

U.S. PATENT DOCUMENTS

| | | | | |
|---|---|---|---|---|
| 5,146,351 | A | | 9/1992 | Maehara ...................... 358/448 |
| 5,576,811 | A | * | 11/1996 | Kobayashi et al. ............ 399/60 |
| 5,887,223 | A | * | 3/1999 | Sakai et al. .................... 399/60 |
| 6,243,542 | B1 | * | 6/2001 | Fujimoto et al. .............. 399/49 |
| 6,290,318 | B1 | | 9/2001 | Yasukawa ..................... 347/16 |
| 2003/0044190 | A1 | * | 3/2003 | Nakayama .................... 399/49 |
| 2003/0049040 | A1 | * | 3/2003 | Tezuka et al. ................. 399/49 |

FOREIGN PATENT DOCUMENTS

| | | |
|---|---|---|
| EP | 0 920 193 A2 | 11/1998 |
| EP | 1199884 A1 * | 4/2002 |
| EP | 1 291 731 A1 | 3/2003 |
| WO | 01/06757 A1 | 1/2001 |

OTHER PUBLICATIONS

U.S. Appl. No. 10/286,775, filed Nov. 4, 2002.

* cited by examiner

*Primary Examiner*—Thomas D. Lee
*Assistant Examiner*—Stephen Brinich
(74) *Attorney, Agent, or Firm*—Fitzpatrick, Cella, Harper & Scinto

(57) ABSTRACT

Provided are a method of making correction for color sensor output values in color image forming apparatus, which succeeds in improving color reproducibility of the color image forming apparatus, and the color image forming apparatus provided with the method. For this purpose, the apparatus and method according to the present invention make correction for deviation due to a color detecting device, of a color sensor output value $S_i$ in detection of a fixed patch; set a boundary turning point D between an ignorable region of toner bearing amounts where the influence of a color of a transferring material is ignorable on chromaticity of the patch and an unignorable region of toner bearing amounts where the influence is unignorable; make further correction for a corrected value $S'_{i\,w}$ after the correction for the deviation due to the color detecting device, using different methods for the unignorable region and the ignorable region, thereby to eliminate the influence of the color of the transferring material on the chromaticity of the patch.

11 Claims, 15 Drawing Sheets

METHOD OF MAKING CORRECTION FOR COLOR SENSOR OUTPUT VALUES IN COLOR IMAGE FORMING APPARATUS, AND COLOR IMAGE FORMING APPARATUS

BACKGROUND OF THE INVENTION

1. Field of the Invention

The present invention relates to color image forming apparatus such as color printers, color copying machines, and so on and, more particularly, to a method of making correction for color sensor output values in color image forming apparatus, and color image forming apparatus, intended for improvement in color reproducibility.

2. Description of the Related Art

In recent years, there has been demand for achievement of higher image quality of output images in color image forming apparatus employing the electrophotographic system, the ink jet system, and the like, such as color printers, color copying machines, and so on.

Especially, the gradation of density and the stability thereof have a large effect on a person's judgment of the quality of an image.

However, a color image forming apparatus varies the density of the images it produces with changes in the environment of the apparatus and with variation of parts of the apparatus due to long-term use.

Particularly, in the case of a color image forming apparatus that uses the electrophotographic system, even a small environmental variation produces a significant variation in the image density, so as possibly to disturb the color balance, and there is thus a need for having means for maintaining density-gradation characteristics constant.

The apparatus is thus provided with process conditions such as several types of exposure amounts, development biases, etc., according to absolute humidities, and a gradation correcting means such as a look-up table (LUT) or the like, for each of the toners of the respective colors used as colorants in the apparatus, and based on the absolute humidity as measured by a temperature-humidity sensor, the apparatus selects the process conditions and the optimal value of gradation correction at that time.

In order to obtain constant density-gradation characteristics even with variation in each part of the apparatus, the apparatus is configured to form a density-detection toner patch of the toners of the respective colors on an intermediate transferring member, a drum, or the like, detect the density of the unfixed toner patch with an unfixed-toner-density detecting sensor (hereinafter referred to as a "density sensor"), and perform feedback density control to feed the result of the detection back to the process conditions of exposure amounts, development biases, etc., thereby obtaining stable images.

However, the density control with the density sensor is based on the detection of the patch formed on the intermediate transferring member, the drum, or the like, and no attempt is made tp control changes in the color balance of an image that may occur in the transferring and fixing of the colorants onto a transferring material.

In particular, density control using a density sensor is not readily adaptable to controlling changes in color balance due to transfer efficiency in transferring the toner image onto the transferring material and due to heating and pressing during fixing.

It is thus contemplated to employ a correction method of forming a gray patch of black (K) and a process gray patch of cyan (C), magenta (M), and yellow (Y) mixed, not on the intermediate transferring member, the drum, or the like, but on the transferring material, comparing colors of the two patches after they have been fixed, relative to each other, thereby detecting any change that may have occurred in the color balance after fixing, and making correction based thereon.

For example, there are a color image forming apparatus equipped with a sensor for detecting if the process gray patch has turned into aromatic color (hereinafter referred to as a "color sensor"), and configured to make correction based on a CMY mixture ratio upon the process gray patch turning achromatic.

The color image forming apparatus of this type is arranged to feed the result of the detection back to exposure amounts and process conditions in an image forming portion, and to a color-matching table for converting RGB signals of an image processing portion into a color reproducible region of the color image forming apparatus, a color separation table for converting RGB signals into CMYK signals, a calibration table for correction for density-gradation characteristics, and so on, whereby the apparatus is able to perform control on the density or chromaticity of the final output image formed on the transferring material.

Although it is possible to perform similar control by detecting the output image of the color image forming apparatus with an external image reading device or with a color meter or a density meter, the above-stated method is superior in that the control is complete in the printer.

This correction method will be described below specifically.

For the purpose of making correction for deviations due to secular change of the sensor or the like, the conventional correction method was arranged so that when the color sensor had an absolute white (color) reference board, the correction for maintaining the balance among RGB output values was carried out utilizing RGB output values obtained by detecting the absolute white reference board with the color sensor; in a case where the color sensor did not have the absolute white reference board, the correction for maintaining the balance among RGB output values was carried out utilizing RGB output values upon detection of a transferring material assumed to be absolute white, with the color sensor.

First, the correction method using an absolute white reference board will be described with reference to FIG. 14.

$S_{si}$ represents the respective measured values of RGB outputs of the absolute white reference board; $S_{f0i}$ represents the respective theoretical values of RGB outputs; $S_i$ represents the respective measured values of RGB outputs of the patch; and $S'_{iw}$ represents the respective RGB output values resulting from the correction using the absolute white reference board.

The first step is to detect the RGB output measured value $S_{si}$ (here and in the following description, i=r, g, or b) of the absolute white reference board (S1401).

The next step is to obtain a correction coefficient $S_{f0i}/S_{si}$ from the RGB output measured value $S_{si}$ of the absolute white reference board as detected and the RGB output theoretical value $S_{f0i}$ preliminarily stored (S1402).

The subsequent step is to obtain the RGB output measured value $S_i$ of the patch (S1403).

Then, according to Eqn. (1) below, the RGB output measured value $S_i$ of the patch thus obtained is uniformly multiplied by the correction coefficient $S_{f0i}/S_{si}$ and is thus converted into the RGB output value $S'_{iw}$ based on the correction using the absolute white reference board (S1404):

$$S'_{iw} = S_i \times (S_{f0i}/S_{si}) \quad (i = r, g, \text{ or } b) \qquad (1)$$

The next step is to output the RGB output value $S'_{iw}$ resulting from the correction using the absolute white reference board (S1405).

FIG. 16 shows the relationship among toner bearing amount, RGB output theoretical value, RGB output measured value $S_i$ of the patch, and RGB output value $S'_{iw}$ resulting from the correction using an absolute white reference board.

Curve (1) indicates the RGB output theoretical value, curve (2) indicates the RGB output measured value $S_i$ of the patch, and curve (3) indicates the RGB output value $S'_{iw}$ resulting from the correction using an absolute white reference board.

Although there are in fact three output values, respectively of R, G, and B, these separate values are abbreviated by i (i=r, g, or b), as mentioned, because the correction method is common thereto.

The objective herein is to correct the RGB output measured value $S_i$ of the patch toward the RGB output theoretical value, i.e., to bring the correction result of curve (2) to a location as close to curve (1) as possible.

It can be said that curve (3), being the correction result using an absolute white reference board, is located closer to curve (1), although there is still some difference.

Next, the correction method using the transferring material will be described referring to FIG. 15.

$S_{0i}$ indicates the respective measured values of RGB outputs of the transferring material; and $S'_{ip}$ the respective RGB output values resulting from the correction using the transferring material.

The first step is to detect the RGB output value $S_{0i}$ of the transferring material (S1501).

The next step is to obtain a correction coefficient $S_{f0i}/S_{0i}$ from the RGB output value $S_{0i}$ of the transferring material as detected and the RGB output theoretical value $S_{f0i}$ preliminarily stored (S1502).

The subsequent step is to obtain the RGB output measured value $(S_i)$ of the patch (S1503).

Then, according to Eqn. (2) below, the RGB output measured value $S_i$ of the patch obtained is uniformly multiplied by the correction coefficient $S_{f0i}/S_{0i}$ and thus is converted into the RGB output value $S'_{ip}$ based on the correction using the transferring material (S1504):

$$S'_{ip} = S_i \times (S_{f0i}/S_{0i}) \quad (i = r, g, \text{ or } b) \qquad (2)$$

The next step is to output the RGB output value $S'_{ip}$ resulting from the correction using the transferring material (S1505).

FIG. 16 shows the relationship among toner bearing amount, RGB output theoretical value, RGB output measured value $S_i$ of the patch, and RGB output value $S'_{ip}$ resulting from the correction using the transferring material.

Curve (1) represents the RGB output theoretical value, curve (2) represents the RGB output measured value $S_i$ of the patch, and curve (4) represents the RGB output value $S'_{ip}$ resulting from the correction using the transferring material.

It can be mentioned that curve (4), being the correction result using the transferring material is located closer to curve (1), although there again still remains some difference.

The color sensor used in these correction methods is arranged to obtain three or more different outputs, such as the RGB outputs or the like, for example, in a configuration where three or more light sources with different emission spectra of red (R), green (G), blue (B), etc., are provided as light emitting devices, or in a configuration wherein a light source emitting light of white color (W) is used as a light emitting device and three or more filters with different spectral transmittances of red (R), green (G), blue (B), etc., are provided on a light receiving device.

In the case of printers of the ink jet type, the color balance also differs depending upon secular change and environmental differences that cause variations in the ink discharge amounts, and upon individual differences among ink cartridges, so that the density-gradation characteristics are not maintained constant; therefore, it is contemplated that control of density or chromaticity may be performed by setting the color sensor near the output portion of the printer and detecting the density or chromaticity of the patch on the transferring material.

As described below, correction was made heretofore for the deviation of the color sensor output values due to the color sensor as color detecting means, using an absolute white reference board or the transferring material.

However, the chromaticity of the patch formed in execution of the density or chromaticity control with the color sensor is affected by the chromaticity of the transferring material.

Therefore, even if the same patch is formed on different transferring materials, the chromaticities of the patches will be affected by those transferring materials, and thus the detection results upon detection of the patch with the color sensor will not be the same in each case.

Especially, a low-density patch is more likely to be affected by the color of the transferring material, because the transferring material is exposed more.

This was responsible for a drop in accuracy of the correction for RGB output values and further induced degradation of color reproducibility of the color image forming apparatus.

Describing it referring to FIG. 16, curve (3) of the RGB output value resulting from the correction using the absolute white reference board increases the difference from curve (1) of the RGB output theoretical value with decrease in the toner bearing amount, because the transferring material is not completely white.

Curve (4) of the RGB output value resulting from the correction using the transferring material agrees with curve (1) of the RGB output theoretical value at the toner bearing amount of 0, but increases the difference from curve (1) of the RGB output theoretical value in the toner bearing range except at the value 0.

Namely, even with correction by either of these methods, a difference occurred between curve (3) or (4) of the correction RGB output value and curve (1) of the RGB output theoretical value because of the influence of the color of the transferring material.

SUMMARY OF THE INVENTION

Under such circumstances, an object of the present invention is to provide a method of making correction for color sensor output values in color image forming apparatus, which can improve the color reproducibility of the color image forming apparatus by making further correction for corrected RGB output values so as to eliminate the influence of the color of the transferring material with patches thereon as much as possible, during detection of the color of the patches with a color sensor, and to provide the color image forming apparatus provided with the method.

For achieving the object, a correction method according to the present invention is a method of making correction for color sensor output values in color image forming apparatus which comprises a color sensor which detects a color of a fixed patch formed on a transferring material, and storage means which stores a theoretical value of color sensor output, and color sensor output values in detection of the transferring material and the patch formed on the transferring material, the method comprising:

making correction for deviation due to the color sensor, of the color sensor output value in detection of the fixed patch;

setting a boundary turning point between an ignorable region of toner bearing amounts where influence of a color of the transferring material is ignorable on chromaticity of the patch and an unignorable region of toner bearing amounts where the influence is unignorable;

making further correction for a corrected value after the correction for the deviation due to the color sensor, using different methods for the unignorable region and the ignorable region; and thereby eliminating the influence of the color of the transferring material on the chromaticity of the patch.

In another aspect, the color image forming apparatus comprises an absolute white reference board, and the correction for the deviation due to the color sensor, of the color sensor output value is performed using:

an output value in detection of the absolute white reference board with the color sensor; and a theoretical value of color sensor output at a toner bearing amount of 0, which can be calculated from light emission characteristics of light emitting means and light reception characteristics of light receiving means of the color sensor.

In another aspect, the correction for the deviation due to the color sensor, of the color sensor output value is performed using:

an output value in detection of a black monochromatic patch at a toner bearing amount where the influence of the color of the transferring material is ignorable on the chromaticity of the patch formed on the transferring material, with the color sensor; and a theoretical value of color sensor output of the black monochromatic patch, which can be calculated from light emission characteristics of light emitting means and light reception characteristics of light receiving means of the color sensor.

In another aspect, the boundary turning point between the ignorable region of toner bearing amounts where the influence of the color of the transferring material is ignorable on the chromaticity of the patch and the unignorable region of toner bearing amounts where the influence is unignorable, is preliminarily determined from a theoretical value of color sensor output, which can be calculated from light emission characteristics of light emitting means and light reception characteristics of light receiving means of the color sensor.

In another aspect, the boundary turning point between the ignorable region of toner bearing amounts where the influence of the color of the transferring material is ignorable on the chromaticity of the patch and the unignorable region of toner bearing amounts where the influence is unignorable, is determined by:

forming on the transferring material a plurality of black monochromatic patches at toner bearing amounts around a tentative boundary turning point preliminarily estimated from light emission characteristics of light emitting means of the color sensor, light reception characteristics of light receiving means, and characteristics of toners used in formation of an image;

detecting the black monochromatic patches with the color sensor;

comparing a corrected value resulting from correction for deviation due to the color sensor, of a color sensor output value of each patch, with a theoretical value which can be calculated from the light emission characteristics of the light emitting means of the color sensor, the light reception characteristics of the light receiving means, and the characteristics of the toners used in formation of the image; and determining whether the deviation-corrected value agrees with the theoretical value or whether a difference between the two values is within a tolerance, so as to determine the boundary turning point.

In another aspect, the method for making the further correction for the corrected value after the correction for the deviation due to the color sensor in the unignorable region where the influence of the color of the transferring material is unignorable on the chromaticity of the patch, is to make correction using a corrected value resulting from correction for deviation due to the color sensor, of the detected patch and the transferring material, and theoretical values of color sensor output at a toner bearing amount of 0 and at a toner bearing amount at the boundary turning point.

In another aspect, the method of making the further correction for the corrected value after the correction for the deviation due to the color sensor in the unignorable region where the influence of the color of the transferring material is unignorable on the chromaticity of the patch, is to make correction using a corrected value resulting from correction for deviation due to the color sensor, of the detected patch, the transferring material, and a patch at the boundary turning point determined by detection of black monochromatic patches at toner bearing amounts around the boundary turning point, and a theoretical value of color sensor output at a toner bearing amount of 0.

In another aspect, the method of making the further correction for the corrected value after the correction for the deviation due to the color sensor in the ignorable region where the influence of the color of the transferring material is ignorable on the chromaticity of the patch, is to output the corrected value resulting from the correction for the deviation due to the color sensor, of the detected patch, as it is.

In another aspect, comparison is made between a corrected value resulting from correction for deviation due to the color sensor, of the transferring material and a theoretical value of color sensor output at a toner bearing amount of 0, and wherein when a difference between the corrected value and the theoretical value exceeds a preset tolerance, an error is defined on the basis of a judgment that it is impossible to implement accurate detection and correction even if the patch is formed on the transferring material.

In another aspect, the color sensor comprises white light emitting means, and light receiving means with an on-chip filter of three or more different colors, and is placed in a conveyance path of the transferring material.

In another aspect, the color sensor comprises light receiving means, and light emitting means of three or more different colors, and is placed in a conveyance path of the transferring material.

In another aspect, the correction is carried out while the toner bearing amounts are replaced by area gradients.

A color image forming apparatus according to the present invention is configured to execute the correction method for the color sensor output values in color image forming apparatus according to the present invention.

Other objects, configurations, and effects of the present invention will become apparent from the following detailed description and drawings.

DETAILED DESCRIPTION OF THE PREFERRED EMBODIMENTS

The preferred embodiments of the present invention will be described below with reference to the drawings.

(Embodiment 1)

The color image forming apparatus will be described first referring to FIGS. 1 to 6 and FIG. 17.

Figure 1:
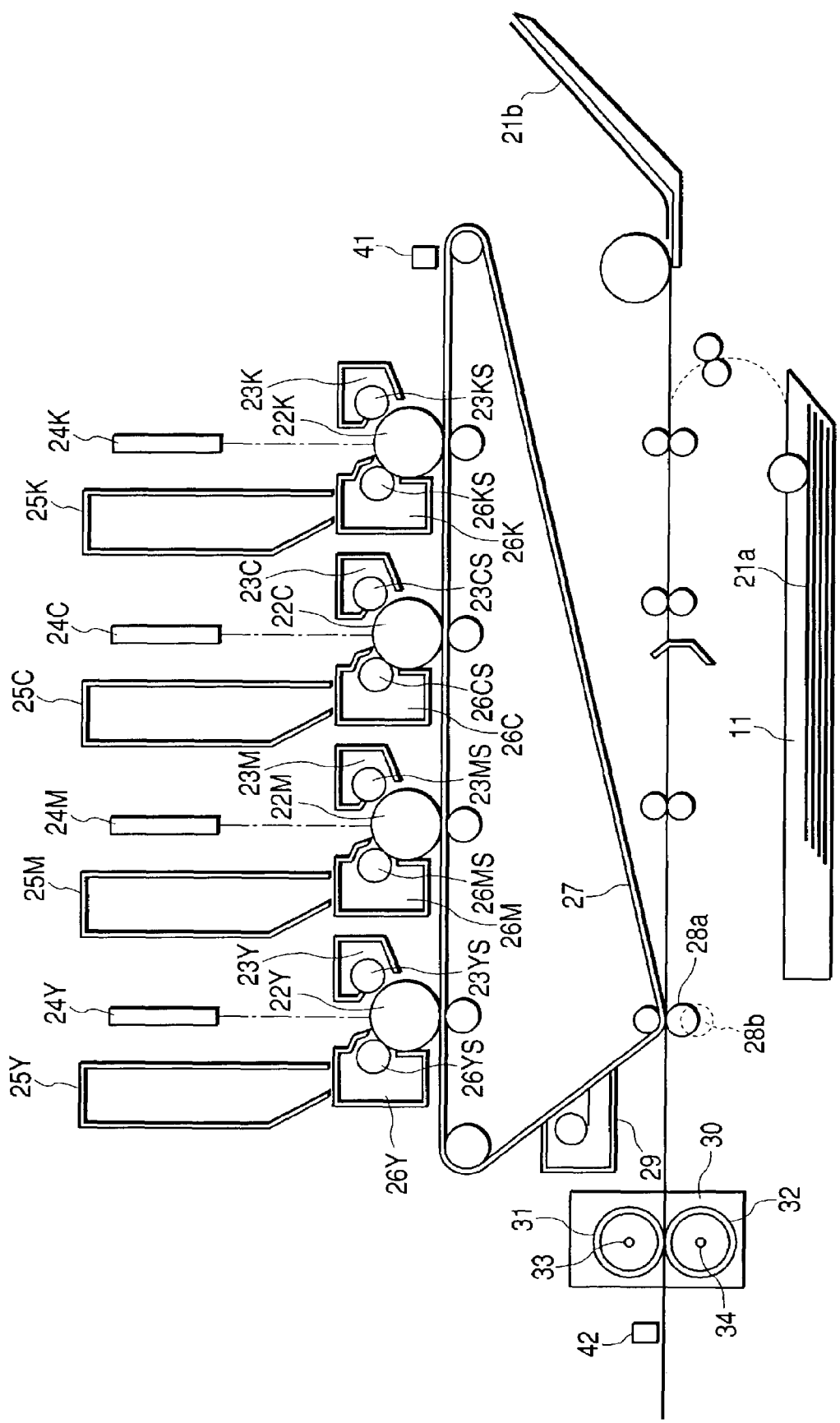
FIG. 1 is a sectional view showing the overall configuration of a color image forming apparatus used in Embodiment 1.
Figure 2:
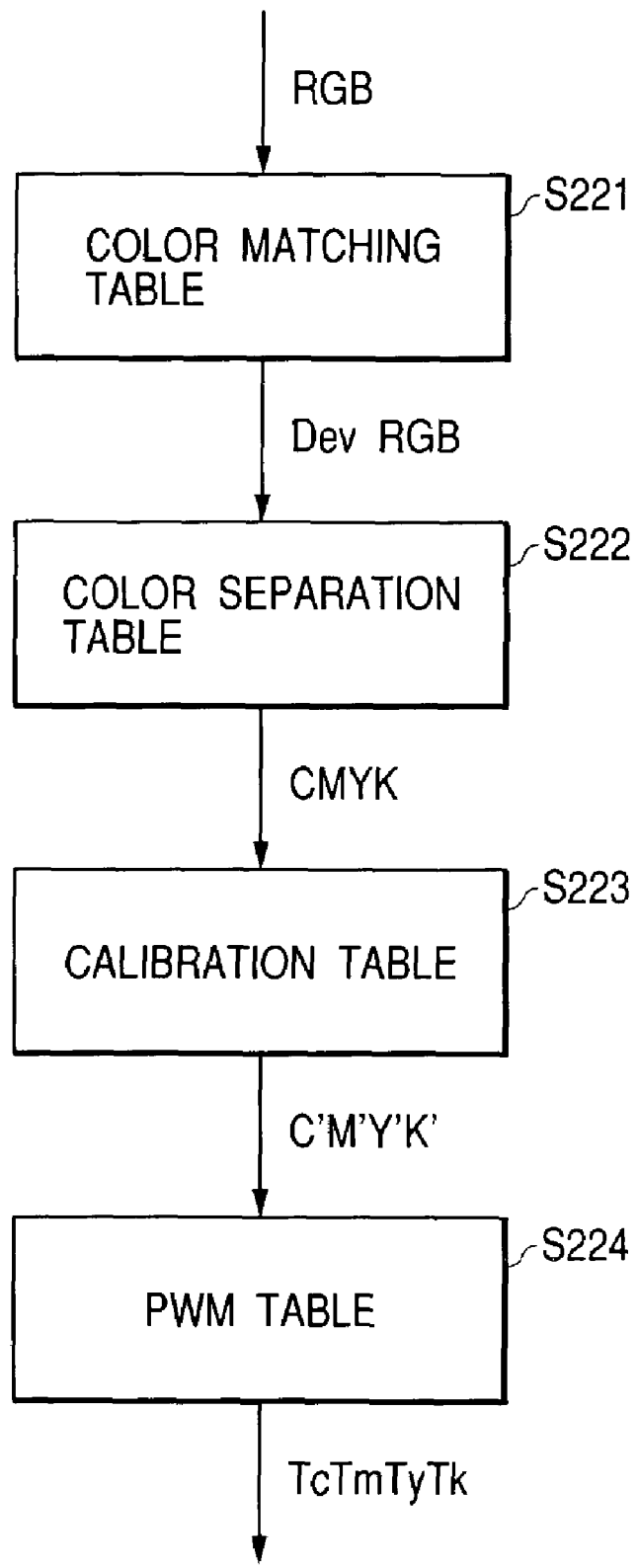
FIG. 2 is a flowchart showing processing in an image processing portion.
Figure 3:
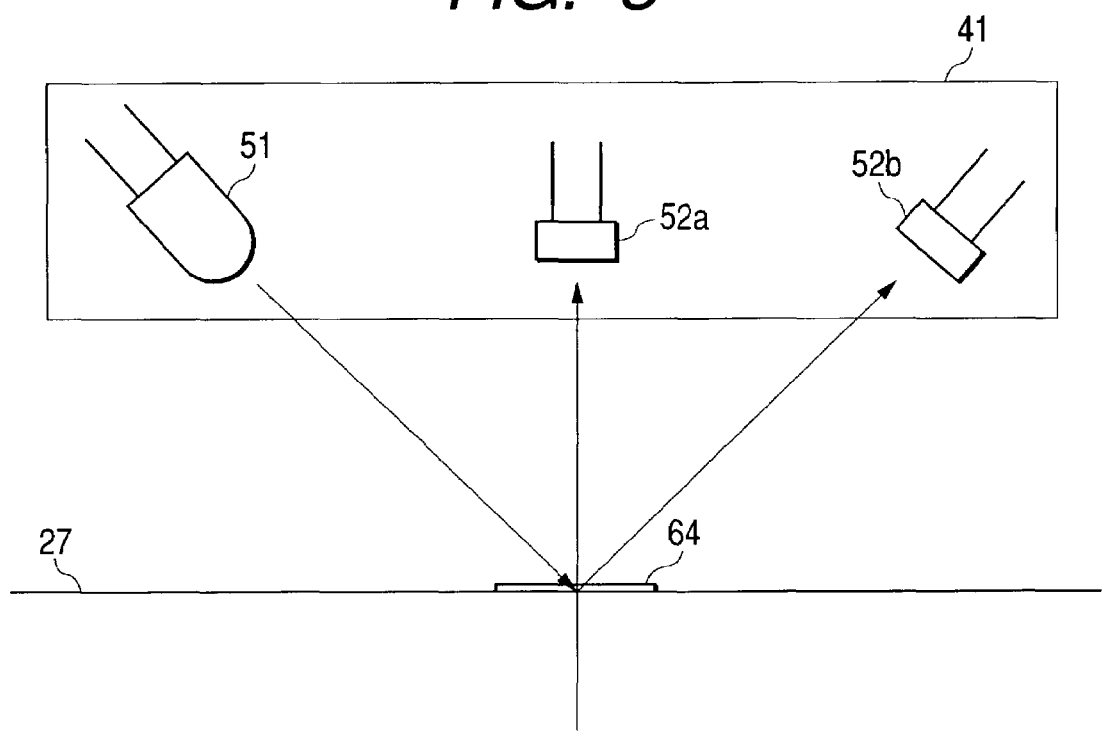
FIG. 3 is a diagram showing a configuration of a density sensor.
Figure 4:
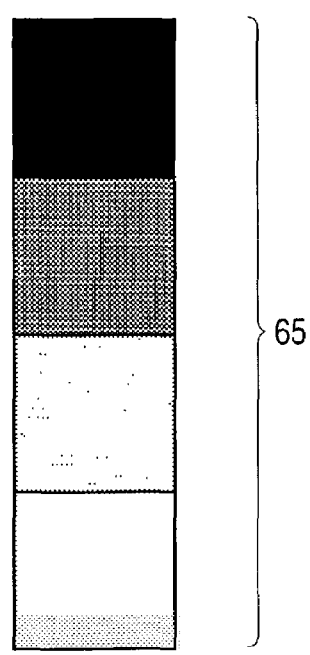
FIG. 4 is a diagram showing a patch pattern for control of density-gradation characteristics formed on an intermediate transferring member.
Figure 5:
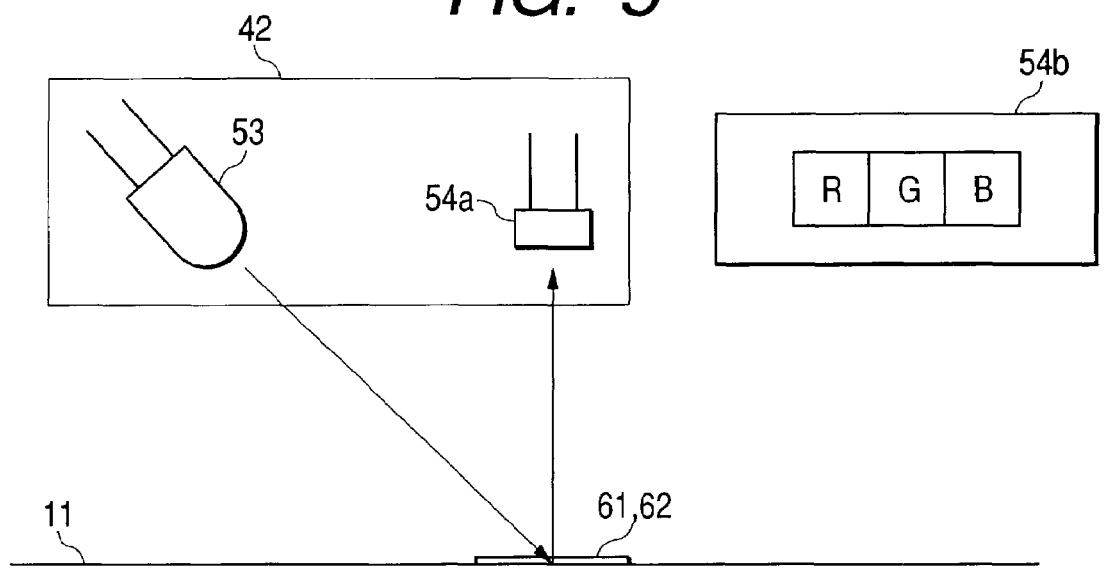
FIG. 5 is a diagram showing a configuration of a color sensor.
Figure 6:
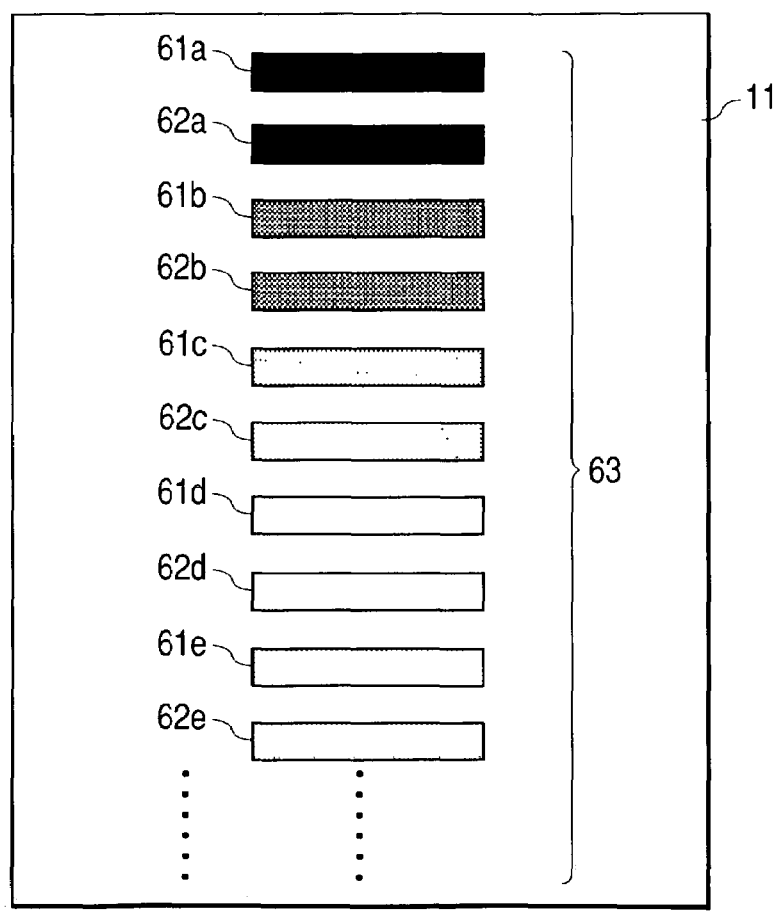
FIG. 6 is a diagram showing a patch pattern for control of density-gradation characteristics formed on a transferring material.
Figure 17:
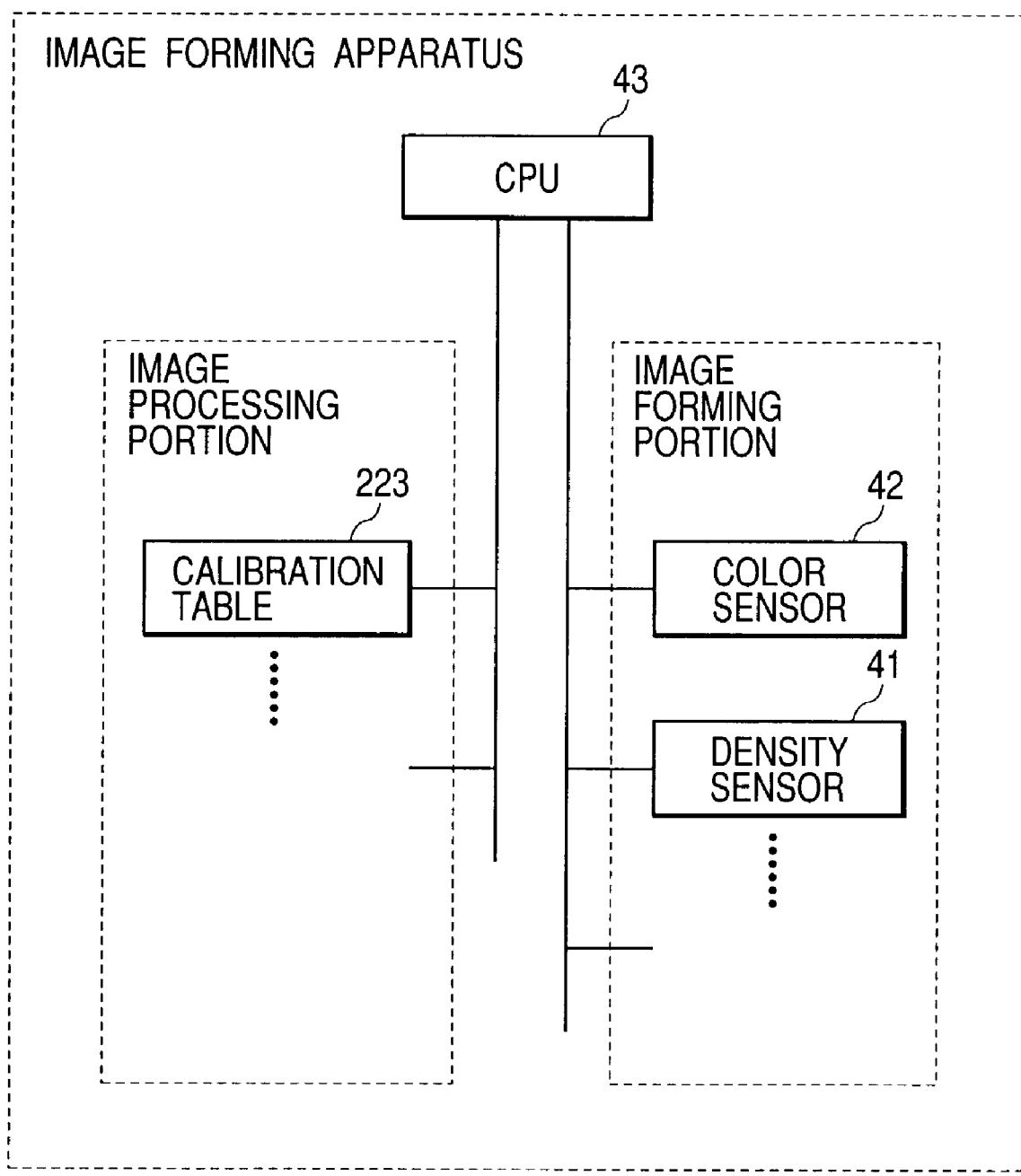
FIG. 17 is an illustration showing an electric system diagram associated with the control of density-gradation characteristics.
Figure 9:
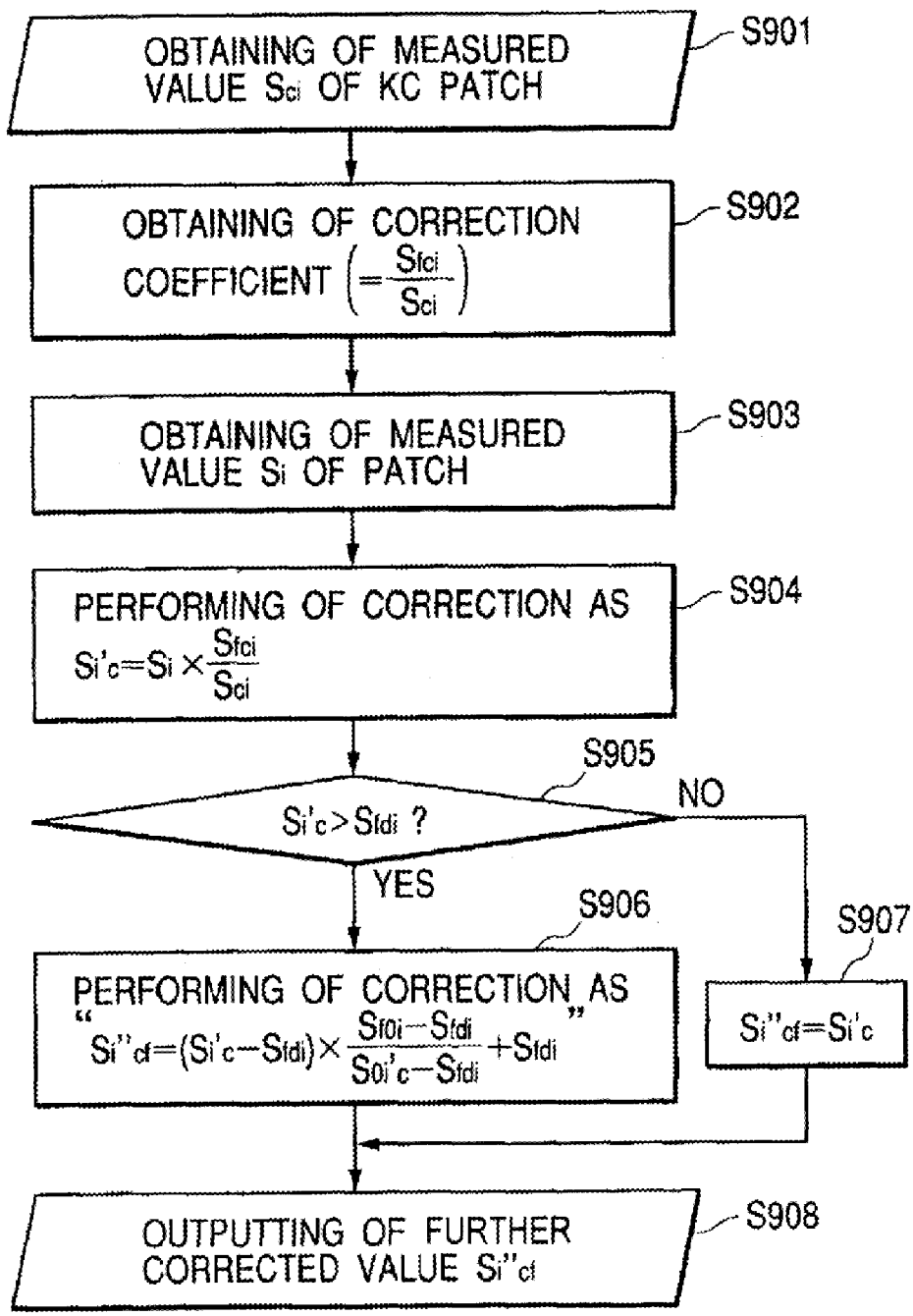

FIG. 1 is a sectional view showing the overall configuration of the color image forming apparatus according to Embodiment 1 of the present invention, FIG. 2 an explanatory diagram showing an example of processing in an image processing portion of the color image forming apparatus, FIG. 3 a diagram showing a configuration of a density sensor, FIG. 4 a diagram showing a patch pattern for control of density-gradation characteristics formed on an intermediate transferring member, FIG. 5 a diagram showing a configuration of a color sensor, FIG. 6 a diagram showing a patch pattern for control of density-gradation characteristics formed on a transferring material, and FIG. 17 an illustration showing an electric system diagram associated with the control of density-gradation characteristics.

The color image forming apparatus in the present embodiment is assumed to be a tandem type color image forming apparatus employing an intermediate transferring member 27, which is an example of the color image forming apparatus of the type using the electrophotographic system, as shown in FIG. 1.

The present color image forming apparatus includes an image forming portion shown in FIG. 1 and an image processing portion (not shown).

First, the processing in the image processing portion will be described referring to FIG. 2.

Step 221 (hereinafter denoted simply by "S221", with similar abbreviations being used also in the following description) is to convert RGB signals indicating colors of an image sent from a personal computer or the like, into device RGB signals (hereinafter denoted by "DevRGB") matched with the color reproducible range of the color image forming apparatus, according to a color matching table preliminarily prepared.

S222 is to convert the DevRGB signals into CMYK signals indicating colors of toner color materials in the color image forming apparatus, according to a color separation table preliminarily prepared.

S223 is to convert the CMYK signals into C'M'Y'K' signals resulting from correction of density-gradation characteristics, according to a calibration table for correction of density-gradation characteristics specific to the individual color image forming apparatus.

S224 is to convert the C'M'Y'K' signals into exposure times Tc, Tm, Ty, and Tk of scanner portions 24C, 24M, 24Y, and 24K corresponding thereto, according to a PWM (Pulse Width Modulation) table.

FIG. 17 is the electric system diagram associated with the control of density-gradation characteristics in the present image forming apparatus. The calibration table 223 belongs to the image processing portion, and density sensor 41 and color sensor 42 belong to the image forming portion. Detected data by the density sensor 41 and the color sensor 42 is transferred to CPU. The CPU 43 carries out an arithmetic operation of calculating a mixture ratio of the three colors CMY of a CMY process gray patch coincident in chromaticity with a certain gray gradient patch of K, as described previously. The result of this arithmetic operation is fed back to the calibration table 223; the result of the operation is transferred from CPU 43 to the calibration table 223 and is reflected in formation of images thereafter.

The structure and operation of the image forming portion in the electrophotographic type color image forming apparatus will be described below referring to FIGS. 1, 3, 4, 5, and 6.

Reference numeral 11 designates transferring materials; 21a and 21b sheet feeding portions; 22Y, 22M, 22C, and 22K photosensitive members (photosensitive drums) for respective stations juxtaposed corresponding to developing colors; 23Y, 23M, 23C, and 23K injection electrifiers as primary charging means; 23YS, 23MS, 23CS, and 23KS sleeves; 24Y, 24M, 24C, and 24K scanner portions; 25Y, 25M, 25C, and 25K toner cartridges; 26Y, 26M, 26C, and 26K developing devices as developing means; 26YS, 26MS, 26CS, and 26KS sleeves; 27 an intermediate transferring member; 28a a transferring roller at a transferring position; 28b the transferring roller at a separated position; 29 a cleaning device; 30 a fixing portion; 31 a fixing roller; 32 a pressing roller; 33 and 34 heaters; 41 a density sensor; 42 a color sensor as color detecting means for detecting chromaticity.

Numeral 51 denotes an infrared light emitting device, and 52a and 52b light receiving devices.

Numeral 53 represents a white LED, and 54a a charge-accumulating sensor with an RGB on-chip filter.

Numerals 61 and 62 denote patch patterns for control of density-gradation characteristics after fixed (after-fixed density-gradation characteristic control patch patterns), wherein 61 represents gray gradation patches, 62 process gray gradation patches, and 63 a patch pattern for control of density-gradation characteristics (patches after fixed) as a combination of the patches 61 and 62.

Numeral 64 designates toner patches, and 65 unfixed monochromatic gradation patches of the K toner.

The image forming portion is configured to form electrostatic latent images with exposure light beams kept on based on exposure times obtained by conversion in the image processing portion, develop the electrostatic latent images to form monochromatic toner images, superimpose the monochromatic toner images to form a multi-color toner image, transfer the multi-color toner image onto the transferring material 11, and fix the multi-color toner image on the transferring material 11 and includes the sheet feeding portions 21, the photosensitive members 22Y, 22M, 22C, 22K for the respective stations juxtaposed corresponding to the developing colors, the injection electrifiers 23Y, 23M, 23C, 23K as primary charging means, the toner cartridges 25Y, 25M, 25C, 25K, the developing devices 26Y, 26M, 26C, 26K, the intermediate transferring member 27, the transferring rollers 28a, 28b, the cleaning device 29, the fixing portion 30, the density sensor 41, and the color sensor 42.

The photosensitive drums (photosensitive members) 22Y, 22M, 22C, 22K are constructed by coating the outer periphery of aluminum cylinders with an organic photoconductive layer and are rotated by driving force of an unrepresented driving motor transmitted thereto. The driving motor rotates the photosensitive drums 22Y, 22M, 22C, 22K counter-clockwise according to the image forming operation.

As primary charging means, the apparatus is provided with the four injection electrifiers 23Y, 23M, 23C, 23K for electrifying the photosensitive drums 22Y, 22M, 22C, 22K of yellow (Y), magenta (M), cyan (C), and black (K) for the respective stations, and the injection electrifiers 23Y, 23M, 23C, and 23K are provided with their respective sleeves 23YS, 23MS, and 23CS.

The exposure light beams to the photosensitive drums 22Y, 22M, 22C, 22K are fed from the respective scanner portions 24Y, 24M, 24C, 24K and impinge on the respective surfaces of the corresponding photosensitive drums 22Y, 22M, 22C, 22K to effect selective exposure thereon, thereby forming electrostatic latent images thereon.

As developing means, for visualizing the electrostatic latent images, there are provided the four developing devices 26Y, 26M, 26C, 26K for developing the images of yellow (Y), magenta (M), cyan (C), and black (K) for the respective stations, and the developing devices 26Y, 26M, 26C and 26K are provided with their respective sleeves 26YS, 26MS, 26CS, and 26KS.

Each of the developing devices 26Y, 26M, 26C, and 26K is detachably mounted.

The intermediate transferring member 27 is in contact with the photosensitive drums 22Y, 22M, 22C, and 22K, rotates clockwise during formation of a color image, and rotates with rotation of the photosensitive drums 22Y, 22M, 22C, 22K, whereby the monochromatic toner images are transferred thereonto.

Thereafter, the intermediate transferring member 27 goes into contact with the transferring roller 28a to hold (nip) and convey the transferring material 11, whereupon the multi-color toner image on the intermediate transferring member 27 is transferred onto the transferring material 11.

While the multi-color toner image is transferred onto the transferring material 11, the transferring roller 28a is in contact with the transferring material 11 at the position of 28a. The transferring roller 28a is moved to the separated position of 28b after completion of the printing process.

The fixing portion 30 is a portion for fusing and fixing the transferred multi-color toner image while conveying the transferring material 11, and is provided with the fixing roller 31 for heating the transferring material 11 and the pressing roller 32 for pressing the transferring material 11 against the fixing roller 31.

The fixing roller 31 and the pressing roller 32 are hollow and contain respective respective heaters 33 and 34 inside.

Namely, the transferring material 11 with the multi-color toner image held thereon is conveyed by the fixing roller 31 and the pressing roller 32, and is subjected to heat and pressure, whereby the toner image is fixed on the surface.

The transferring material 11 after the fixing of the toner image is then discharged onto an unrepresented sheet discharge tray by unrepresented sheet discharging rollers, and the image forming operation is terminated.

The cleaning device 29 is a device for cleaning the toner remaining on the intermediate transferring member 27, and the waste toner, which remains after the multi-color toner image of the four colors formed on the intermediate transferring member 27 is transferred onto the transferring material 11, is stored in a cleaner container.

The density sensor 41 is positioned as directed toward the intermediate transferring member 27 in the color image forming apparatus of FIG. 1 and measures the density of the toner patches formed on the surface of the intermediate transferring member 27.

An example of the configuration of the density sensor 41 is presented in FIG. 3.

The density sensor 41 includes an infrared light emitting device 51 such as LED or the like, light receiving devices 52 such as photodiodes, CdS, or the like, unrepresented IC and others for processing received light data, and an unrepresented holder housing these components.

The light receiving device 52a detects the intensity of irregular reflection from the toner patch 64, while the light receiving device 52b detects the intensity of regular reflection from the toner patch 64.

By detecting both the regular reflection intensity and the irregular reflection intensity, it becomes feasible to detect the density of the toner patch 64 in the range from high density to low density.

An optical element such as a lens or the like, not shown, is also used for coupling between the light emitting device 51 and the light receiving device 52 in certain cases.

FIG. 4 shows an example of the patch pattern for control of density-gradation characteristics formed on the intermediate transferring member.

There are unfixed monochromatic gradation patches 65 of K toner aligned with each other, in this pattern.

Unrepresented monochromatic gradation patches of C, M, and Y toners are also formed subsequent thereto.

The density sensor 41 is unable to discriminate the colors of the toners on the intermediate transferring member 27.

For this reason, the monochromatic toner gradation patches 65 are formed on the intermediate transferring member 27.

Thereafter, this density data is fed back to the calibration table for correction of density-gradation characteristics in the image processing portion and each of the process conditions in the image forming portion.

The density sensor 41 can also be one capable of converting a detected density into a color difference from a specific paper kind only for the monochromatic patches of C, M, Y, and K, using a conversion table for converting the detected density into the color difference from the specific paper kind, and outputting the color difference.

When the density sensor 41 is one capable of outputting the color difference from the specific paper kind as well as the density, it is also possible to control color difference-gradation characteristics of each of C, M, Y, and K from the specific paper kind, instead of controlling the density-gradation characteristics of each of C, M, Y, and K.

In this case, each density reading in the density-gradation characteristic control described heretofore should actually be a reading of the color difference from the specific paper kind.

By controlling the color difference-gradation characteristics of each of C, M, Y, and K from the specific paper kind, it becomes feasible to obtain gradation characteristics better matching human vision characteristics.

The color sensor 42 is located as directed toward the image forming surface of the transferring material 11 downstream of the fixing portion 30 in the transferring material conveying path in the color image forming apparatus of FIG. 1 and is configured to detect RGB output values of the colors of mixed color patches after fixed, formed on the transferring material 11.

By placing the color sensor inside the color image forming apparatus, it becomes feasible automatically to detect the image after fixed, prior to the discharging of the sheet onto the sheet discharge portion.

FIG. 5 shows an example of a configuration of the color sensor 42.

The color sensor 42 is comprised of a white LED 53 as white light emitting means, and a charge-accumulating sensor 54a with an RGB on-chip filter as light receiving means with an on-chip filter of three or more different colors, and is placed in the conveyance path of the transferring material 11.

The white LED 53 emits white light so as to be obliquely incident at the angle of 45° (degrees) to the transferring material 11 on which the after-fixed density-gradation characteristic control patch patterns 61, 62 are formed, and the charge-accumulating sensor 54a with the RGB on-chip filter detects the intensity of irregular reflection in the direction of 0°.

The light-receiving portion of the charge-accumulating sensor 54a with the RGB on-chip filter is comprised of RGB pixels independent of each other like 54b.

The charge-accumulating sensor in the charge-accumulating sensor 54a with the RGB on-chip filter may be a photodiode.

The light-receiving portion may be one that includes a plurality of sets of three RGB pixels.

The sensor may also be configured in a configuration wherein the angle of incidence is 0° and the angle of reflection 45°.

Furthermore, the color sensor may be one comprised of LEDs which emit beams of the three colors R, G and B, as light emitting means of three or more different colors, and a filterless sensor as light receiving means.

FIG. 6 shows an example of the after-fixed density-gradation characteristic control patch patterns formed on the transferring material 11.

The density-gradation characteristic control patch patterns 61, 62 are gradation patch patterns of gray which is the center of the color reproducible range and which is a very important color in terms of achieving the color balance.

The patches are comprised of the gray gradation patches 61 of black (K) and the process gray gradation patches 62 of cyan (C), magenta (M), and yellow (Y) mixed, and the gray gradation patches 61 of K and the CMY process gray gradation patches 62 close in chromaticity in the standard color image forming apparatus are arranged in pairs, e.g., 61a and 62a, 61b and 62b, 61c and 62c, . . . .

The color sensor 42 detects RGB output values of the after-fixed density-gradation characteristic control patch patterns 61 and 62.

The after-fixed density-gradation characteristic control patch patterns 61 and 62 formed on the transferring material 11 do not always have to be limited to gray patch patterns, but may also be monochromatic gradation patch patterns of C, M, Y, and K.

Namely, they may be patches fixed from the unfixed monochromatic gradation patches 65 of K toner formed on the intermediate transferring member 27, described previously.

The mixture ratio of the three colors CMY in a process gray patch of the three colors CMY mixed, which is approximately equal in chromaticity to a certain gradient gray patch of K, can be calculated from the RGB output values of the gray gradation patch 61 of K and the CMY process gray gradation patch 62.

In the present embodiment the correction described below is carried out based on the configuration described above.

The correction method in Embodiment 1 will be described referring to FIGS. 7 and 8.

Figure 7:
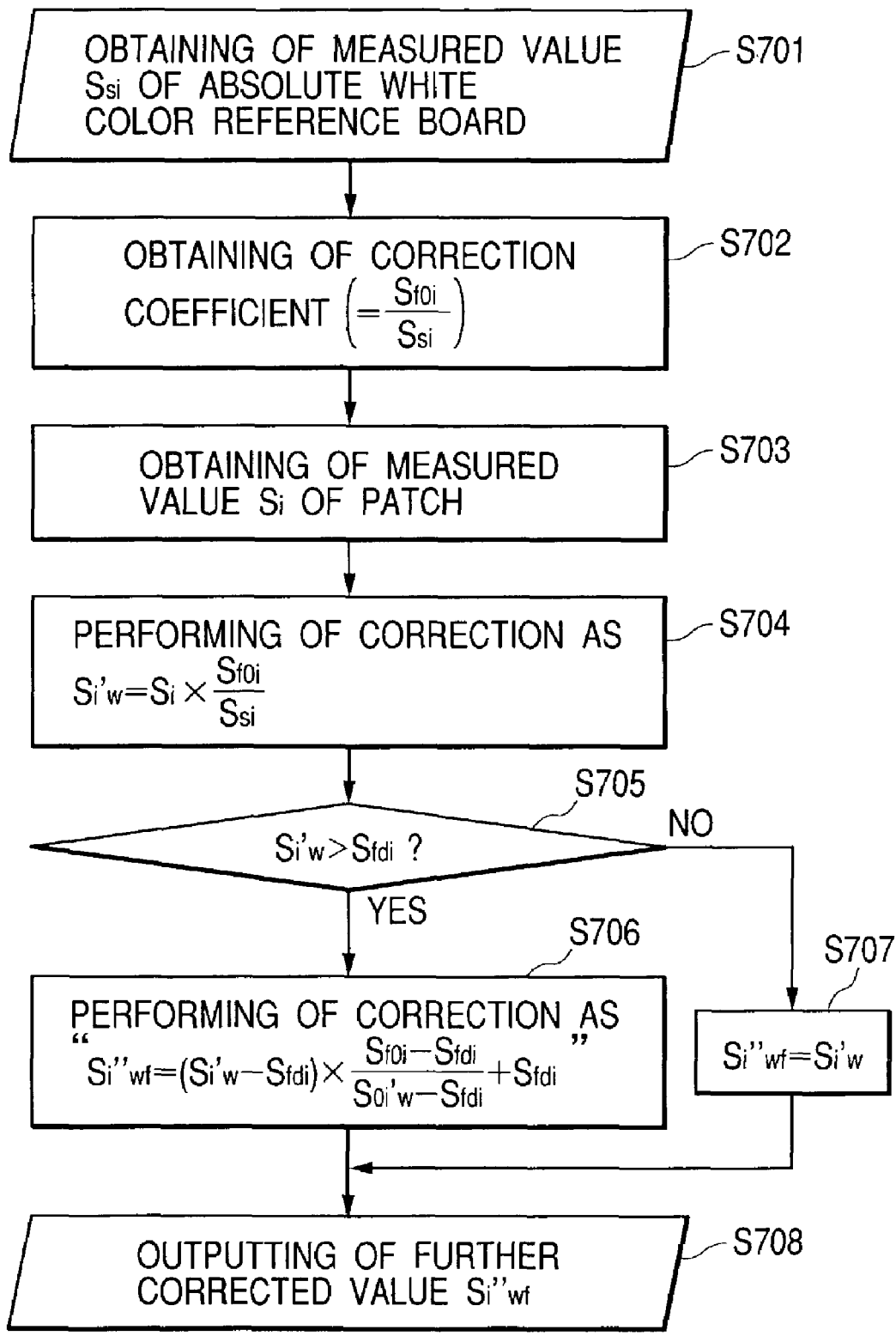
FIG. 7 is a flowchart showing a correction method for RGB output values in Embodiment 1.

FIG. 7 is a flowchart to explain the correction method of RGB output values in the present embodiment.

Figure 8:
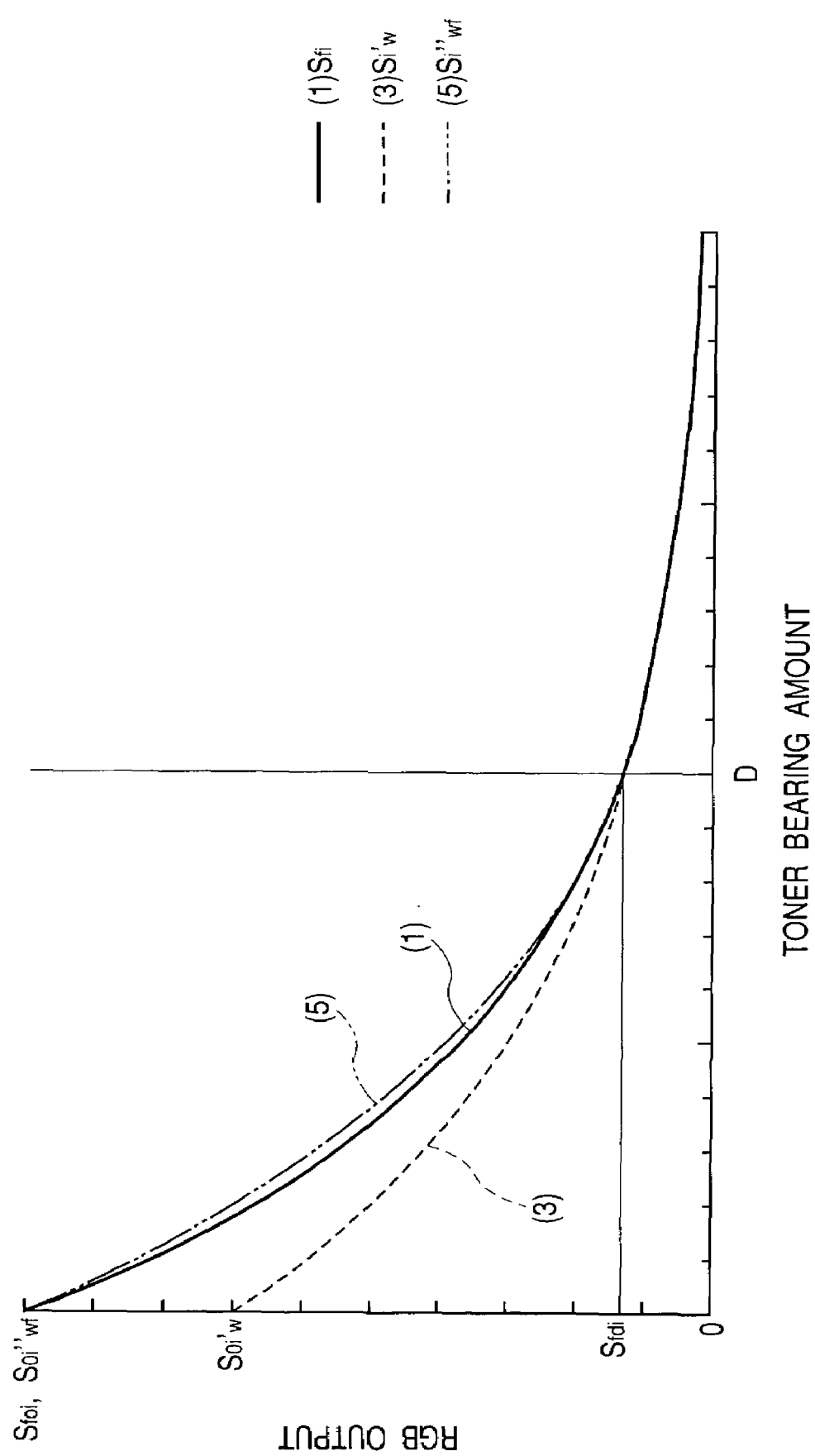
FIG. 8 is a graph showing the correction method for RGB output values in Embodiment 1.

FIG. 8 is a graph showing the relationship among toner bearing amount, RGB output value, partway calculated value (corrected RGB output value), and further corrected RGB output value, based on the procedure of correction for RGB output values.

D represents a boundary turning point (hereinafter referred to as a turning point); $S_{si}$ the respective RGB output measured values of the absolute white color reference board, which are values outputted upon detection of the absolute white color reference board with the color sensor; $S_{0i}$ the respective RGB output values of the transferring material 11; $S_{f0i}$ the respective RGB output theoretical values at the toner bearing amount of 0 which are theoretical values of color sensor outputs at the toner bearing amount of 0 and which can be calculated from the light emission characteristics of the light-emitting means and the light reception characteristics of the light-receiving means of the color sensor; $S_{fdi}$ the respective RGB output theoretical values at the toner bearing amount at the turning point which are theoretical values of color sensor outputs at the boundary turning point; $S_i$ the respective RGB output measured values being color sensor output values; $S'_{iw}$ the respective RGB output values resulting from the correction using the absolute white color reference board, which are corrected values produced after the correction for the deviation of the detected patches due to the color sensor; $S'_{0iw}$ the respective RGB output values resulting from the correction using the absolute white color reference board at the toner bearing amount of 0, which are corrected values produced after the correction for the deviation of the transferring material due to the color sensor; $S_i''_{wf}$ the respective further corrected RGB output values in Embodiment 1; and $S_{0i}''_{wf}$ the respective further corrected RGB output values in Embodiment 1 at the toner bearing amount of 0 (in each symbol, as above, i=r, g, or b; this is also the case in the following description).

The present embodiment relates to the correction method of the image forming apparatus having the absolute white reference board.

Immediately before detection of the after-fixed density-gradation characteristic control patch pattern 63 formed on the transferring material 11 with the color sensor 42, the absolute white reference board is detected by the color sensor 42 and the RGB output measured value $S_{si}$ thereof is stored in a storage device (S701).

Furthermore, the color sensor 42 detects a region without the after-fixed density-gradient characteristic control patch pattern 63 in the transferring material 11 having the after-fixed density-gradation characteristic control patch pattern 63 formed thereon, and the RGB output value $S_{0i}$ thereof is stored in the storage device.

Since the detections of the absolute white reference board and the transferring material 11 are carried out every time before detection, the storage device does not have to be a nonvolatile memory.

Furthermore, the RGB output theoretical value $S_{f0i}$ and $S_{fdi}$ at the toner bearing amount of 0 and at the toner bearing amount at the turning point D described hereinafter are preliminarily stored in a nonvolatile storage device.

The RGB output theoretical value is given by the product of the emission spectrum of the light source of the color sensor 42, the spectral sensitivity of the light receiving device, and the coupling efficiency between the light emitting and light receiving devices where the detection object is a perfect diffuser surface.

Then a correction coefficient $S_{f0i}/S_{si}$ is calculated from the RGB output measured value $S_{si}$ of the absolute white reference board detected and the RGB output theoretical value $S_{f0i}$ preliminarily stored (S702).

Then the after-fixed density-gradation characteristic control patch pattern 63 is detected by the color sensor 42 to obtain the RGB output measured value $S_i$ (S703).

Thereafter, calculation according to Eqn (3) below is carried out to calculate the RGB output value $S_i'_w$ based on the correction using the absolute white reference board (S704):

$$S_i'_w = S_i \times (S_{f0i}/S_{si}) \ (i=r, g, \text{ or } b) \quad (3)$$

In this calculation, the measured value is multiplied by the coefficient for converting the RGB output value $S_{si}$ upon the detection of the absolute white reference board into the RGB output theoretical value $S_{f0i}$ at the toner bearing amount of 0.

By uniformly carrying out the above correction for all of the RGB output values, correction can be made for the deviation due to the secular change of the color sensor 42, the variation thereof, and so on.

Then, comparison is made according to the following formula (S705):

$$S_i'_w > S_{fdi} \ (i=r, g, \text{ or } b)$$

$S_{fdi}$: RGB output theoretical value at the turning point D

The turning point D is a boundary point at which the influence of the color of the transferring material 11 becomes unignorably large on the chromaticity of the after-fixed density-gradation characteristic control patch pattern 63 and which is preliminarily set in the middle density range, for example, at the toner bearing amount of 50% from the theoretical values of color sensor outputs that can be calculated from the light emission characteristics of the light-emitting means and the light reception characteristics of the light-receiving means of the color sensor.

$S_{fdi}$ represents the RGB output theoretical value at the turning point D set preliminarily.

When the foregoing inequality is true, it is determined that the after-fixed density-gradation characteristic control patch pattern 63 is of the toner bearing amount smaller than that at the turning point D and that the color of the transferring material 11 exercises an unignorable influence on the chromaticity of the after-fixed density-gradation characteristic control patch pattern 63. When the inequality is false, it is determined that the toner bearing amount is larger than that at the turning point D and that the influence of the color of the transferring material 11 on the chromaticity of the after-fixed density-gradation characteristic control patch pattern 63 is ignorable.

When the result of the comparison at S705 is "true," the flow goes to S706. When it is "false," the flow goes to S707.

At S706, calculation is carried out according to Eqn (4) below to calculate the further corrected RGB output value $S_i''_{wf}$ in Embodiment 1:

$$S_i''_{wf} = (S_i'_w - S_{fdi}) \times [(S_{f0i} - S_{fdi})/(S_{0i}'_w - S_{fdi})] + S_{fdi} \ (i=r, g, \text{ or } b) \quad (4)$$

In FIG. 8, only $S_i'_w$ on the lower density side than the turning point D, after subtraction of $S_{fdi}$ from $S_i'_w$, is uniformly multiplied by the coefficient for converting $S_i'_w$ ($S_{0i}'_w$) at the toner bearing amount of 0 into $S_{f0i}$.

At S707, the further corrected RGB output value in Embodiment 1 is determined according to $S_i''_{wf} = S_i'_w$.

The reason for it is that the chromaticity of the after-fixed density-gradation characteristic control patch pattern 63 is considered to be hardly affected on the higher density side than the turning point D.

S708 is to output the further corrected RGB output value $S_i''_{wf}$ in Embodiment 1.

It is seen from FIG. 8 that the further corrected RGB output value $S_i''_{wf}$ in Embodiment 1 (curve (5)) is much closer to the RGB output theoretical value (curve (1)) than the corrected RGB output value $S_i'_w$ by the conventional correction method using the absolute white reference board (curve (3)).

Namely, the correction method of the present embodiment is able to eliminate the influence of the transferring material 11, as compared with the conventional correction method.

Accordingly, when the apparatus is constructed in the configuration wherein the correction of the present embodiment is applied to all the RGB output values and the corrected RGB output values are utilized in the subsequent feedback control to the image processing portion and to the image forming portion, it becomes feasible to carry out the control with better accuracy than before and improve the color reproducibility of the color image forming apparatus.

However, when the transferring material 11 has very high chroma or low brightness, the correction according to the present embodiment might result in failing to attain desired correction accuracy.

The apparatus may be configured to perform error detection in such a way that when the after-fixed density-gradation characteristic control patch pattern 63 to be detected by the color sensor 42 is formed on such a transferring material 11, an error is detected to cancel the detection of the after-fixed density-gradation characteristic control patch pattern 63.

A method of the error detection is as follows.

The RGB output value $S_{0i}$ of the transferring material 11 detected immediately before the correction is converted into $S_{0i'w}$ as at S704.

Then the RGB output value $S_{0i'w}$ resulting from the correction using the absolute white reference board at the toner bearing amount of 0 is compared with the RGB output theoretical value $S_{f0i}$ at the toner bearing amount of 0, for each of RGB.

When the result of the comparison is that the two values are largely different, it is determined that this transferring material 11 has high chroma or low brightness and satisfactory accuracy is not expected in the control even with formation of the after-fixed density-gradation characteristic control patch pattern 63, thus making a judgment of an error.

A criterion to make a judgment of an error, e.g., an error is determined when $S_{0i'}/S_{f0i}$ is equal to or less than 0.7, is preliminarily set.

The present embodiment was described as to the relation between toner bearing amount and RGB output value, assuming the color image forming apparatus of the electrophotographic system, but much the same as the present embodiment can also be applied to the color image forming apparatus of the ink jet system and the like, by replacing the toner bearing amount with an area gradient and employing the relation between area gradient and RGB output value.

(Embodiment 2)

The correction method in Embodiment 2 will be described referring to FIGS. 9 and 10.

Figure 9:
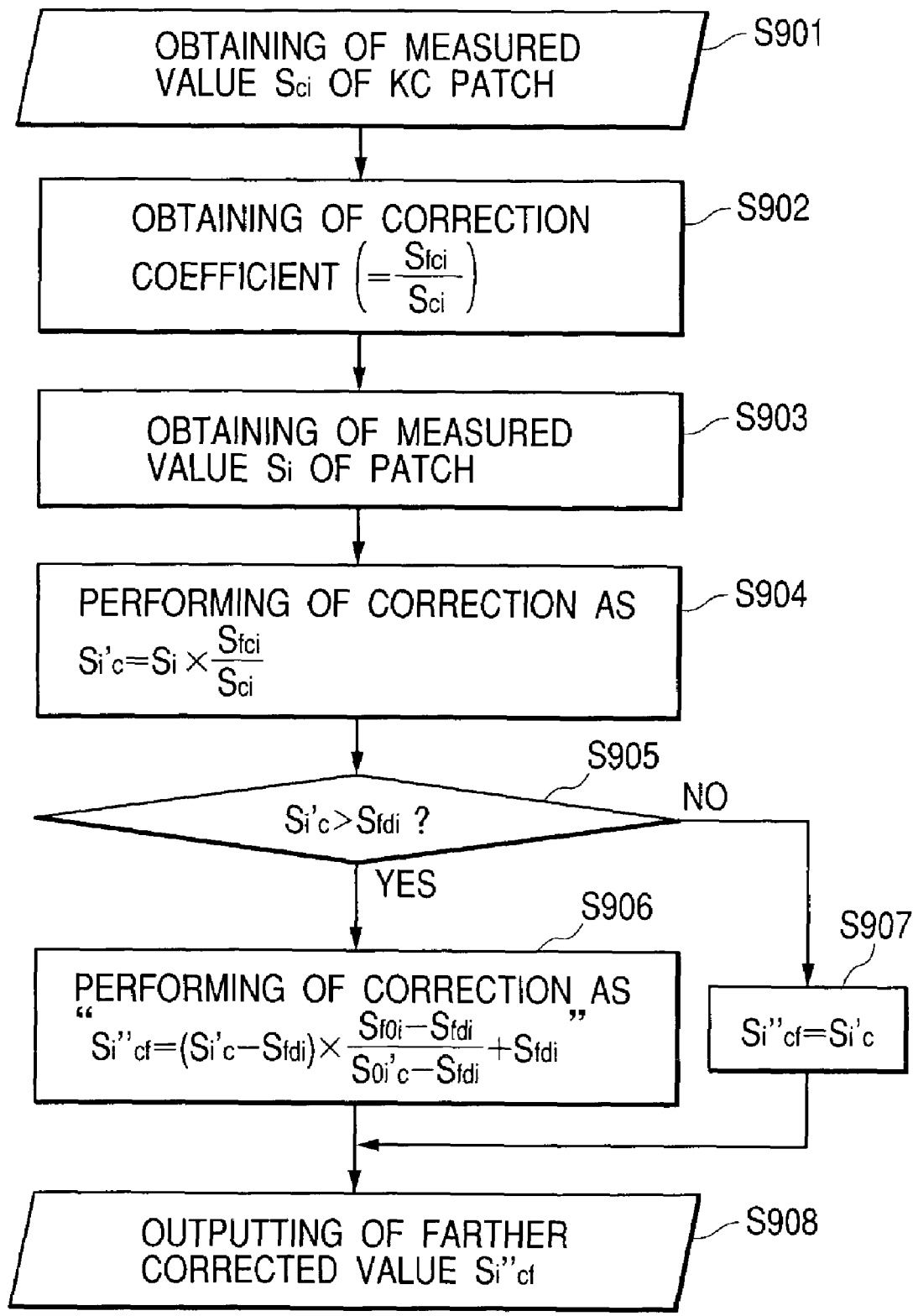
FIG. 9 is a flowchart showing a correction method for RGB output values in Embodiment 2.

FIG. 9 is a flowchart explaining the correction method for RGB output values in the present embodiment.

Figure 10:
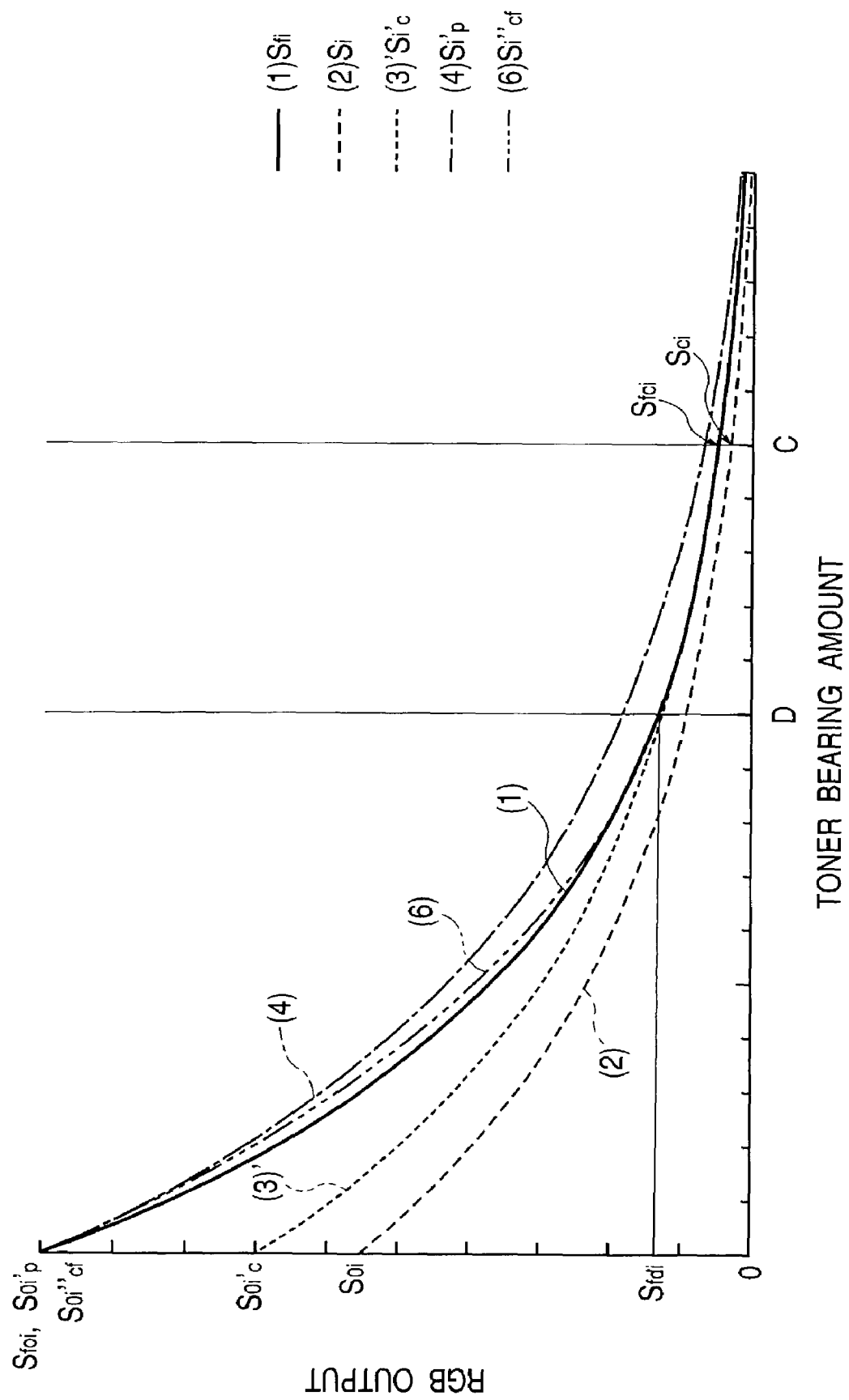
FIG. 10 is a graph showing the correction method for RGB output values in Embodiment 2.

FIG. 10 is a graph showing the relationship among toner bearing amount, RGB output value, halfway calculated value (corrected RGB output value), and further corrected RGB output value, based on the procedure of correction for RGB output values, in the present embodiment.

C represents an RGB correction point; $S_{ci}$ the respective RGB output measured values of a KC patch which are output values upon detection of a black monochromatic patch at a toner bearing amount where the influence of the color of the transferring material formed on the transferring material on the chromaticity of the patch is ignorable; $S_{fci}$ the respective RGB output theoretical values at the toner bearing amount of the RGB correction point C, which are theoretical values of color sensor outputs of the black monochromatic patch that can be calculated from the light emission characteristics of the light-emitting means and the light reception characteristics of the light-receiving means of the color sensor; $S_{i'c}$ the respective RGB output values resulting from correction by the correction point C using the transferring material, which are corrected values produced after correction for the deviation of the detected patches due to the color sensor; $S_{0i'c}$ the respective RGB output values resulting from correction by the correction point C using the transferring material at the toner bearing amount of 0, which are corrected values produced after correction for the deviation of the transferring material due to the color sensor; $S_{i}''_{cf}$ the respective further corrected RGB output values in Embodiment 2; and $S_{0i}''_{cf}$ the respective further corrected RGB output values in Embodiment 2 at the toner bearing amount of 0.

The present embodiment is principally different from Embodiment 1 in that the absolute white reference board is not used.

Immediately before the sensor 42 detects the after-fixed density-gradation characteristic control patch pattern 63 formed on the transferring material 11, a black (K) monochromatic patch of a toner bearing amount equivalent to that at the present RGB correction point C (hereinafter referred to as a KC patch) is formed on the transferring material 11 in the high density region where the influence of the color of the transferring material 11 is sufficiently small (ignorable) on the chromaticity of the after-fixed density-gradation characteristic control patch pattern 63, the KC patch is detected by the color sensor 42, and the RGB output value $S_{ci}$ thereof is stored in the storage device (S901).

For example, the toner bearing amount at the RGB correction point C is set as 75%.

Furthermore, the color sensor 42 detects a region without the after-fixed density-gradation characteristic control patch pattern 63 in the transferring material 11 having the after-fixed density-gradation characteristic control patch pattern 63 formed thereon, and the RGB output value $S_{0i}$ thereof is stored in the storage device.

Since the detections of the KC patch and the transferring material 11 are carried out every time before the detection, the storage device does not have to be a nonvolatile memory.

Furthermore, the RGB output theoretical values $S_{f0i}$, $S_{fdi}$, and $S_{fci}$ at the toner bearing amount of 0, at the toner bearing amount at the turning point D, and at the toner bearing amount at the RGB correction point C are preliminarily stored in a nonvolatile storage device.

The RGB output theoretical value at the toner bearing amount of 0 is given by the product of the emission spectrum of the light source of the color sensor 42, the spectral sensitivity of the light receiving device, and the coupling efficiency between the light-emitting and light-receiving devices where the detection object is a perfect diffuser surface.

At each of the turning point D and the RGB correction point C, the RGB output theoretical value is given by the product of the emission spectrum of the light source of the color sensor 42, the spectral sensitivity of the light receiving device, the spectral reflectance of the patch of the toner bearing amount equivalent to that at the turning point D or at the RGB correction point C, the patch being formed on an absolute white transferring material 11, and the coupling efficiency between the light-emitting and light-receiving devices where the detection object is a perfect diffuser surface.

However, since there exists no absolute white transferring material in practice, the spectral reflectances of patches of toner bearing amounts equivalent to those at the turning point D and at the RGB correction point C may be determined from a difference between spectral reflectances of two patches which are formed in different toner bearing amounts and on the chromaticity of which the influence of the transferring material 11 is sufficiently small.

The next step is to determine a correction coefficient $S_{fci}/S_{ci}$ from the RGB output measured value $S_{ci}$ of the KC patch detected and the RGB output theoretical value $S_{fci}$ preliminarily stored (S902).

Then S903 is to detect the after-fixed density-gradation characteristic control patch pattern 63 with the color sensor 42 to obtain the RGB output measured value $S_i$.

Thereafter, S904 is to perform calculation according to Eqn (5) below to obtain the RGB output value $S'_{i_c}$ based on the correction by the correction point C, using the transferring material:

$$S'_{i_c} = S_i \times (S_{fci}/S_{ci}) \quad (i=r, g, \text{ or } b) \tag{5}$$

In this calculation, $S_i$ is multiplied by the coefficient for converting the RGB output value $S_{ci}$ upon the detection of the KC patch into the RGB output theoretical value $S_{fci}$ at the RGB correction point C.

Since the influence of the transferring material 11 on the chromaticity of the patch at the RGB correction point C is sufficiently small, the calculation is uniformly performed for all the RGB output values of R, G, and B, whereby correction can be made for the deviation due to the secular change and variation of the color sensor 42 and the like.

Next, S905 is to perform comparison according to the following formula:

$$S'_{i_c} > S_{fdi} \quad (i=r, g, \text{ or } b)$$

$S_{fdi}$: RGB output theoretical value at the turning point D.

The turning point D is a boundary point where the influence of the color of the transferring material 11 on the chromaticity of the patch becomes unignorably large, and is preliminarily set in the middle density range, e.g., at the toner bearing amount of 50%, from the theoretical values of the color sensor outputs that can be calculated from the light emission characteristics of the light-emitting means and the light reception characteristics of the light-receiving means of the color sensor.

Accordingly, the turning point D is always set on the lower density side than the RGB correction point C.

$S_{fdi}$ represents each of the RGB output theoretical values at the turning point D set preliminarily.

When the foregoing inequality is true, it is determined that the patch is of the toner bearing amount smaller than that at the turning point D and that the influence of the color of the transferring material 11 on the chromaticity of the after-fixed density-gradation characteristic control patch pattern 63 is not ignorable. When the inequality is false, it is determined that the patch is of the toner bearing amount larger than that at the turning point D and that the influence of the color of the transferring material 11 on the chromaticity of the after-fixed density-gradation characteristic control patch pattern 63 is ignorable.

When the result of the comparison at S905 is "true," the flow goes to S906; when it is "false," the flow goes to S907.

S906 is to perform calculation according to Eqn (6) below to obtain the further corrected RGB output value $S''_{i_{cf}}$ in Embodiment 2:

$$S''_{i_{cf}} = (S'_{i_c} - S_{fdi}) \times [(S_{f0i} - S_{fdi})/(S_{0i_c}' - S_{fdi})] + S_{fdi} \quad (i=r, g, \text{ or } b) \tag{6}$$

In FIG. 10, only $S'_{i_c}$ on the lower density side than the turning point D, after subtraction of $S_{fdi}$ from $S'_{i_c}$, is uniformly multiplied by the coefficient for converting $S'_{i_c}$ at the tone bearing amount of 0, i.e., $S_{0i_c}'$ into $S_{f0i}$.

S907 is to determine the further corrected RGB output value in Embodiment 2, according to $S''_{i_{cf}} = S'_{i_c}$.

The reason for it is that the chromaticity of the after-fixed density-gradation characteristic control patch pattern 63 is considered to be hardly affected by the transferring material 11 on the higher density side than the turning point D.

Then, S908 is to output the further corrected RGB output value $S''_{i_{cf}}$ in Embodiment 2.

It is seen from FIG. 10 that the further corrected RGB output value $S''_{i_{cf}}$ in Embodiment 2 (curve (6)) is much closer to the RGB output theoretical value (curve (1)) than the corrected RGB output value $S'_{i_p}$ resulting from the correction by the conventional correction method where the transferring material is assumed to be absolute white (curve (4)) and the corrected RGB output value $S'_{i_c}$ resulting from the correction by the correction point C using the transferring material (curve (3)').

Namely, the correction method in the present embodiment is able to eliminate the influence of the transferring material 11, as compared with the conventional correction method.

Accordingly, when the apparatus is configured so that the correction of the present embodiment is performed for all the RGB output values and the further corrected RGB output values in Embodiment 2 are applied to the subsequent feedback control to the image processing portion and to the image forming portion, it is feasible to carry out the control with better accuracy than before and at lower cost by virtue of dispensing with the absolute white reference board used in Embodiment 1, and to improve the color reproducibility of the color image forming apparatus.

Just as in Embodiment 1, however, the correction in the present embodiment might result in failing to achieve the desired correction accuracy when the transferring material 11 has very high chroma or low brightness.

When the after-fixed density-gradation characteristic control patch pattern 63 to be detected by the color sensor 42 is formed on such a transferring material 11, it is also possible to define it as an error and perform the error detection to cancel the detection of the after-fixed density-gradation characteristic control patch pattern 63.

A method of the error detection is as follows.

The RGB output value $S_{0i}$ of the transferring material 11 detected immediately before the correction is converted into $S_{0i_c}'$, as at S904.

Then comparison is made between the RGB output value $S_{0i_c}'$ resulting from the correction by the correction point C using the transferring material at the toner bearing amount of 0 and the RGB output theoretical value $S_{f0i}$ at the toner bearing amount of 0, for each of RGB.

When the result of the comparison is that the two values are greatly different, the transferring material 11 has high chroma or low brightness and an error is thus judged, on the assumption that the control is not ensured with satisfactory accuracy even if the after-fixed density-gradation characteristic control patch pattern 63 is formed.

A criterion to judge an error, e.g., an error is defined when $S_{0i_c}'/S_{f0i}$ is equal to or less than 0.7, is preliminarily set.

The present embodiment was described as to the relation between toner bearing amount and RGB output value, assuming the color image forming apparatus of the electrophotographic system, but much the same arrangement as the present embodiment can also be applied to the color image forming apparatus of the ink jet system and the like, by replacing the toner bearing amount with the area gradient and employing the relationship between area gradient and RGB output value.

(Embodiment 3)

The correction method in Embodiment 3 will be described referring to FIGS. 11 and 12.

Figure 11:
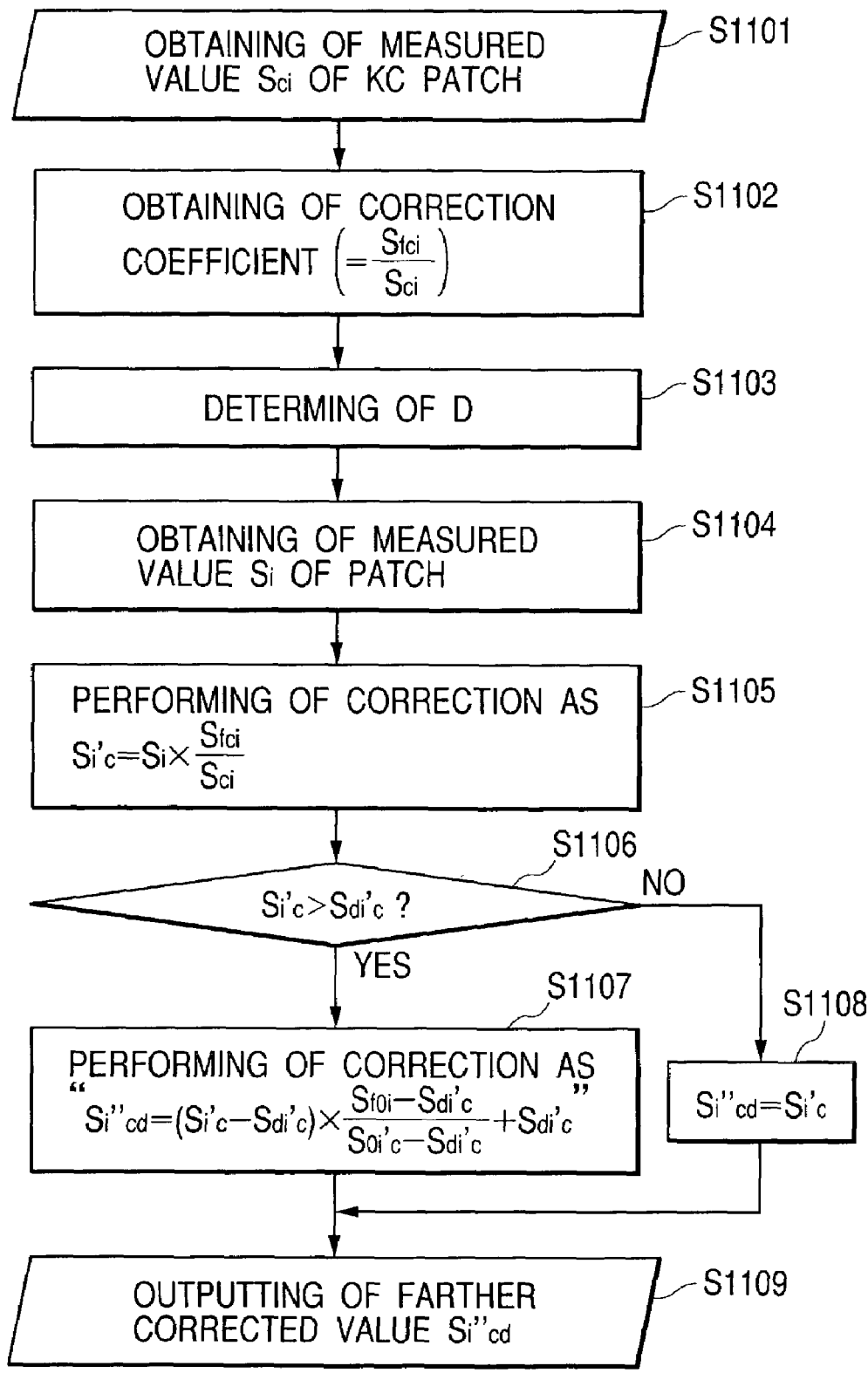
FIG. 11 is a flowchart showing a correction method for RGB output values in Embodiment 3.

FIG. 11 is a flowchart to explain the correction method for RGB output values in the present embodiment.

Figure 12:
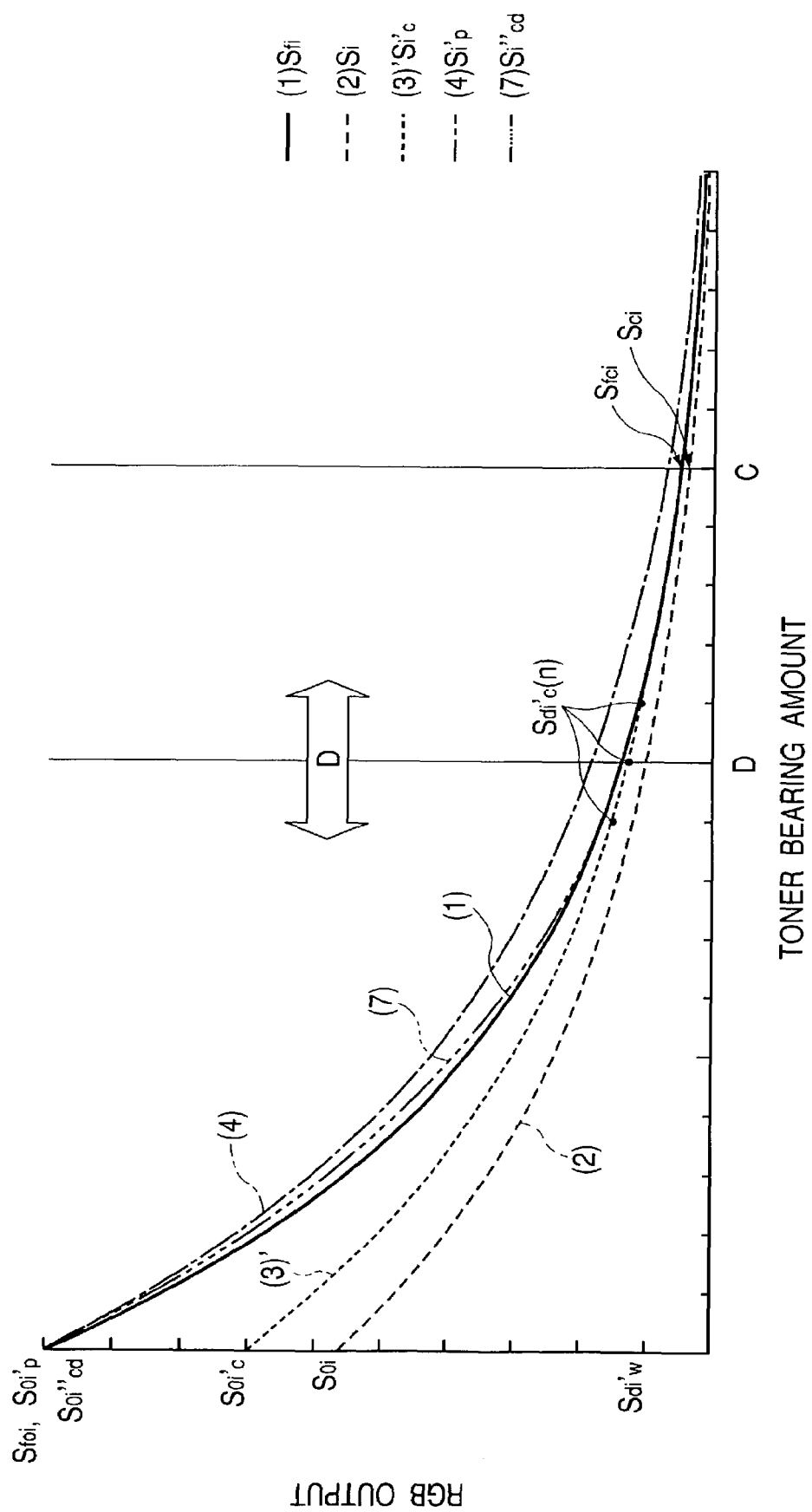
FIG. 12 is a graph showing the correction method for RGB output values in Embodiment 3.

FIG. 12 is a graph showing the relationship among toner bearing amount, RGB output value, halfway calculated value (corrected RGB output value), and further corrected RGB output value, based on the procedure of correction for RGB output values in the present embodiment.

$S_i''_{cd}$ represents the respective further corrected RGB output values in Embodiment 3; $S_{0i}''_{cd}$ RGB the respective further corrected output values in Embodiment 3 at the toner bearing amount of 0; $S_{dr}(n)$, $S_{dg}(n)$, and $S_{db}(n)$ (n=1, 2, . . ., in decreasing order from the largest toner bearing amount, which is also the case in the following description) output measured values of the respective colors R, G, and B of a KD patch; $S_{dr'c}(n)$, $S_{dg'c}(n)$, and $S_{db'c}(n)$ (n=1, 2, . . . ) output values of the respective colors R, G, and B of a KD patch resulting from the correction by the correction point C using the transferring material; $S_{f0r}$, $S_{f0g}$, and $S_{f0b}$ output theoretical values of the respective colors R, G, and B at the toner bearing amount of 0, which are theoretical values that can be calculated from the light emission characteristics of the light-emitting means of the color sensor, the light reception characteristics of the light-receiving means, and the characteristics of the toners used in formation of image; $S_{fcr}$, $S_{fcg}$, and $S_{fcb}$ output theoretical values of the respective colors R, G, and B at the correction point C, which are theoretical values that can be calculated from the light emission characteristics of the light-emitting means of the color sensor, the light reception characteristics of the light-receiving means, and the characteristics of the toners used in formation of image; $S_{di}$ the respective RGB output measured values at the turning point D determined; and $S_{di'c}$ the respective RGB output values resulting from the correction by the correction point C using the transferring material for the RGB output measured values $S_{di}$ at the turning point D determined, which are corrected values resulting from the correction for the deviation due to the color sensor, of the patch at the boundary turning point determined.

The present embodiment is mainly different from Embodiment 2 in that the turning point D is variable, black (K) monochromatic patches (hereinafter referred to as "KD patches") are formed on the transferring material 11, and the KD patches are detected by the color sensor 42 to determine the turning point D every time.

Immediately before the color sensor 42 detects the after-fixed density-gradation characteristic control patch pattern 63 formed on the transferring material 11, a black (K) monochromatic patch of a toner bearing amount equivalent to that at the RGB correction point C (hereinafter referred to as a KC patch) is formed on the transferring material 11 (the RGB correction point C is present in the high density region where the influence of the color of the transferring material 11 is sufficiently small on the chromaticity of the after-fixed density-gradation characteristic control patch pattern 63), the color sensor 42 detects the KC patch, and the RGB output value $S_{ci}$ thereof is stored in the storage device (S1101).

The toner bearing amount at the RGB correction point C is set, for example, as 75%.

Furthermore, the color sensor 42 detects a region without the after-fixed density-gradation characteristic control patch pattern 63 on the transferring material 11 having the after-fixed density-gradation characteristic control patch pattern 63 formed thereon, and the RGB output value $S_{0i}$ thereof is stored in the storage device.

Since the detections of the KC patch and the transferring material 11 are carried out every time before the detection, the storage device does not have to be a nonvolatile memory.

Furthermore, the RGB output theoretical values $S_{f0i}$, $S_{fdi}$, and $S_{fci}$ at the toner bearing amount of 0, at the toner bearing amount at the turning point D, and at the toner bearing amount at the RGB correction point C, are preliminarily stored in the nonvolatile storage device.

The RGB output theoretical value at the toner bearing amount of 0 is given by the product of the emission spectrum of the light source of the color sensor 42, the spectral sensitivity of the light receiving device, and the coupling efficiency between the light emitting and light receiving devices where the detection object is a perfect diffuser surface.

Each of the RGB output theoretical values at the turning point D and at the RGB correction point C is given by the product of the emission spectrum of the light source of the color sensor 42, the spectral sensitivity of the light-receiving device, the spectral reflectance of the patch of the toner bearing amount equivalent to that at the turning point D or at the RGB correction point C, the patch being formed on the absolute white transferring material, and the coupling efficiency between the light-emitting and light-receiving devices where the detection object is a perfect diffuser surface.

However, since there exists no absolute white transferring material in practice, the spectral reflectances of the patches of the toner bearing amounts equivalent to those at the turning point D and at the RGB correction point C may be determined by forming two patches of different toner bearing amounts with sufficiently small influence of the transferring material 11 on the chromaticity thereof and calculating them from the difference between spectral reflectances of the two patches.

The next step is to obtain a correction coefficient $S_{fci}/S_{ci}$ from the RGB output measured value $S_{ci}$ of the absolute white reference board detected and the RGB output theoretical value $S_{fci}$ preliminarily stored (S1102).

The following will describe a method of forming the KD patches on the transferring material 11, detecting the KD patches by the color sensor 42, and thereby determining the turning point D.

The KD patches consist of a plurality of monochromatic patches of black (K) formed at different toner bearing amounts on the transferring material 11, around the boundary where the influence of the color of the transferring material 11 becomes unignorably large on the chromaticity of the after-fixed density-gradation characteristic control patch pattern 63.

For example, a plurality of monochromatic patches of black are formed at slightly varying toner bearing amounts around the toner bearing amount of 50%.

Figure 13:
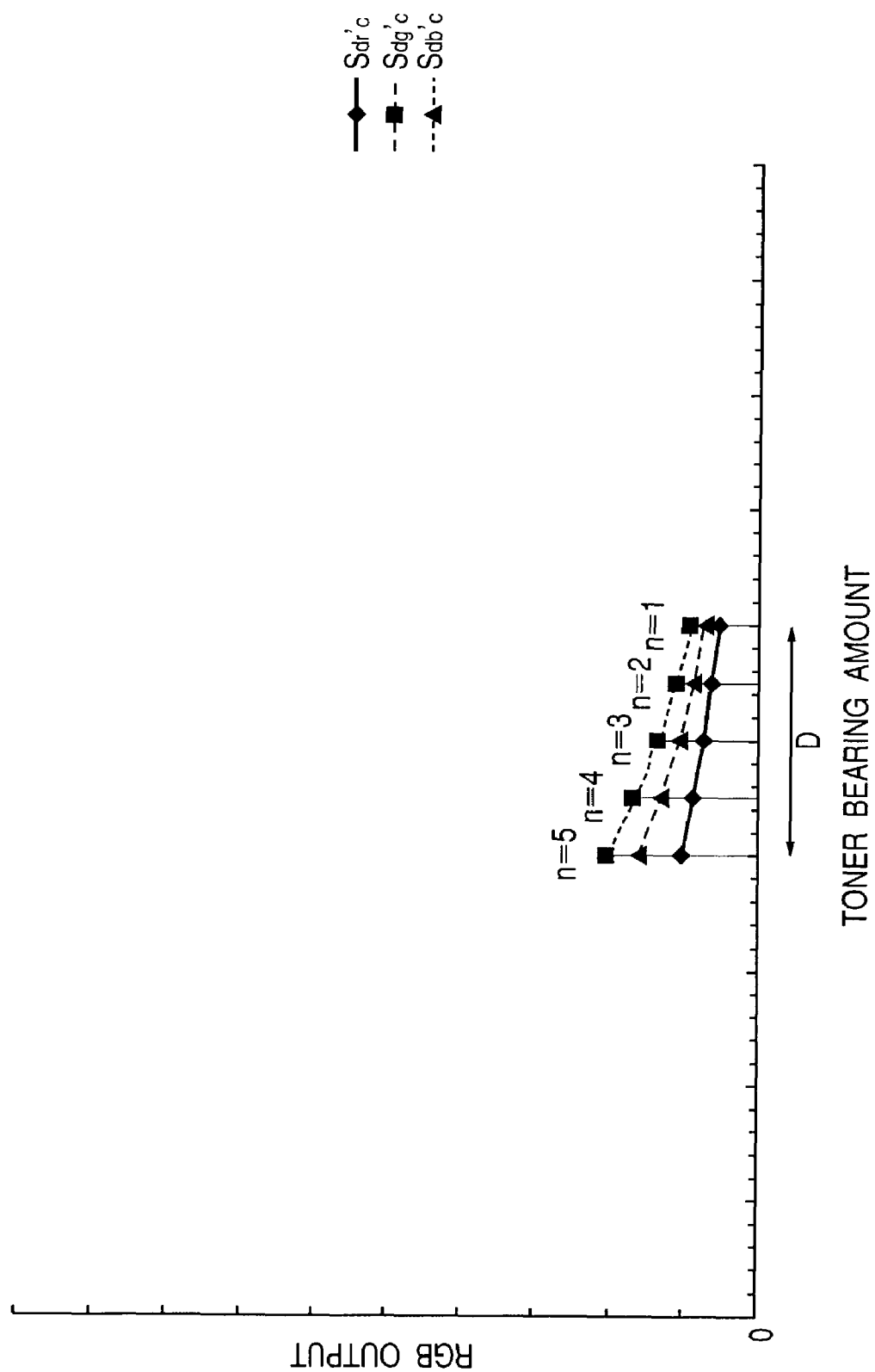
FIG. 13 is a graph showing a method of determining a turning point in Embodiment 3.
Figure 14:
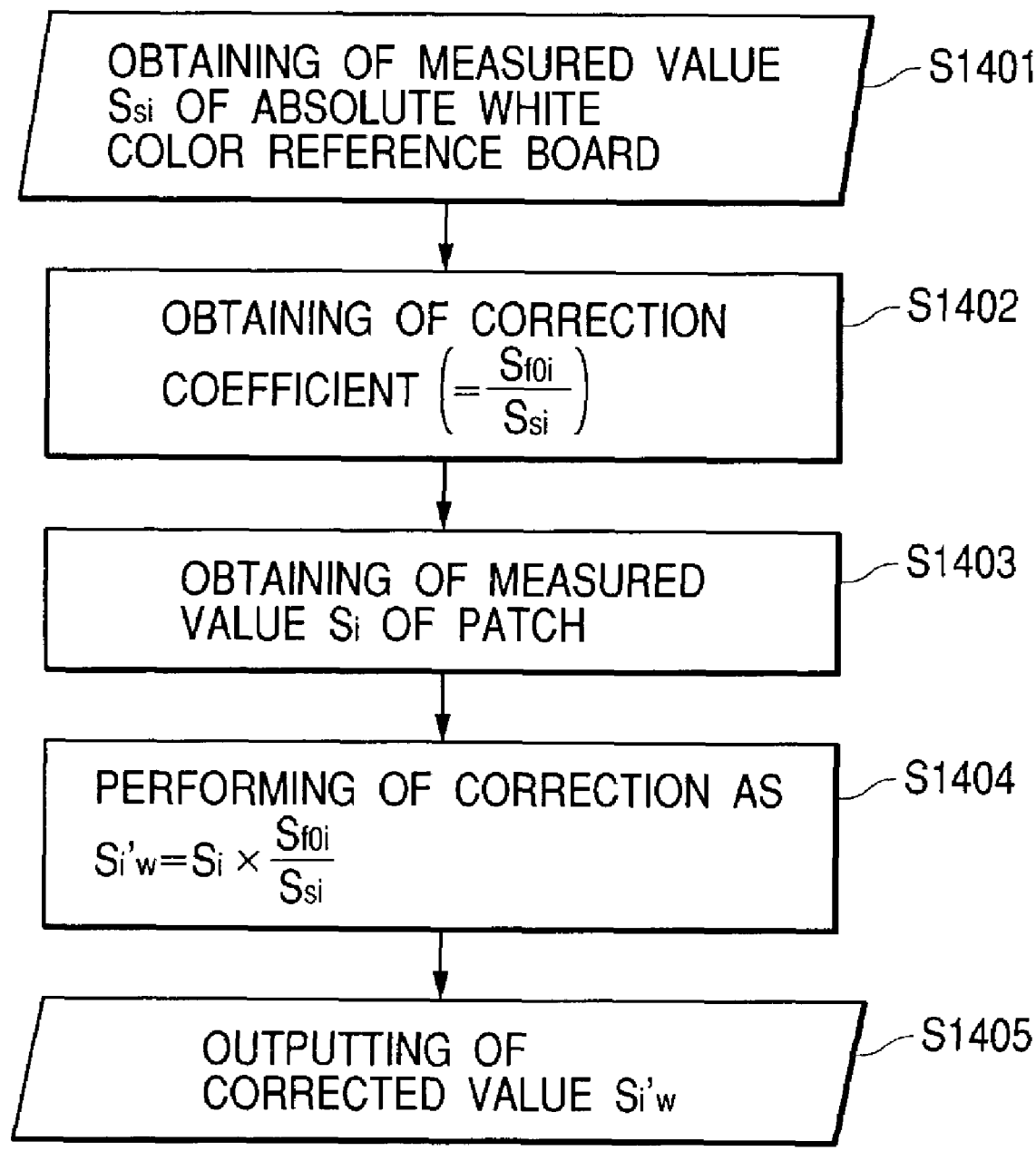
FIG. 14 is a flowchart showing a correction method for RGB output values in the conventional example.
Figure 15:
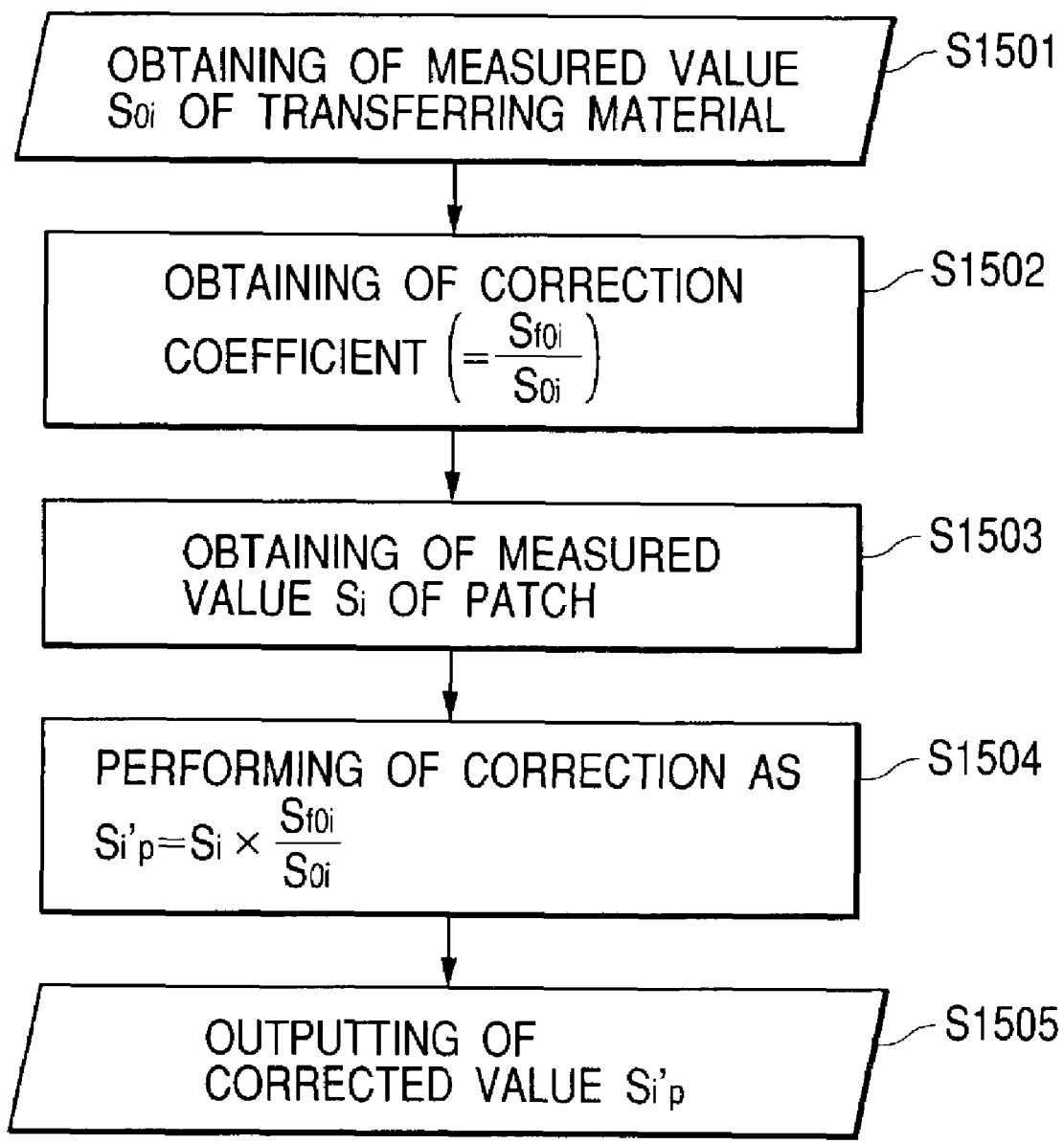
FIG. 15 is a flowchart showing a correction method for RGB output values in the conventional example.
Figure 16:
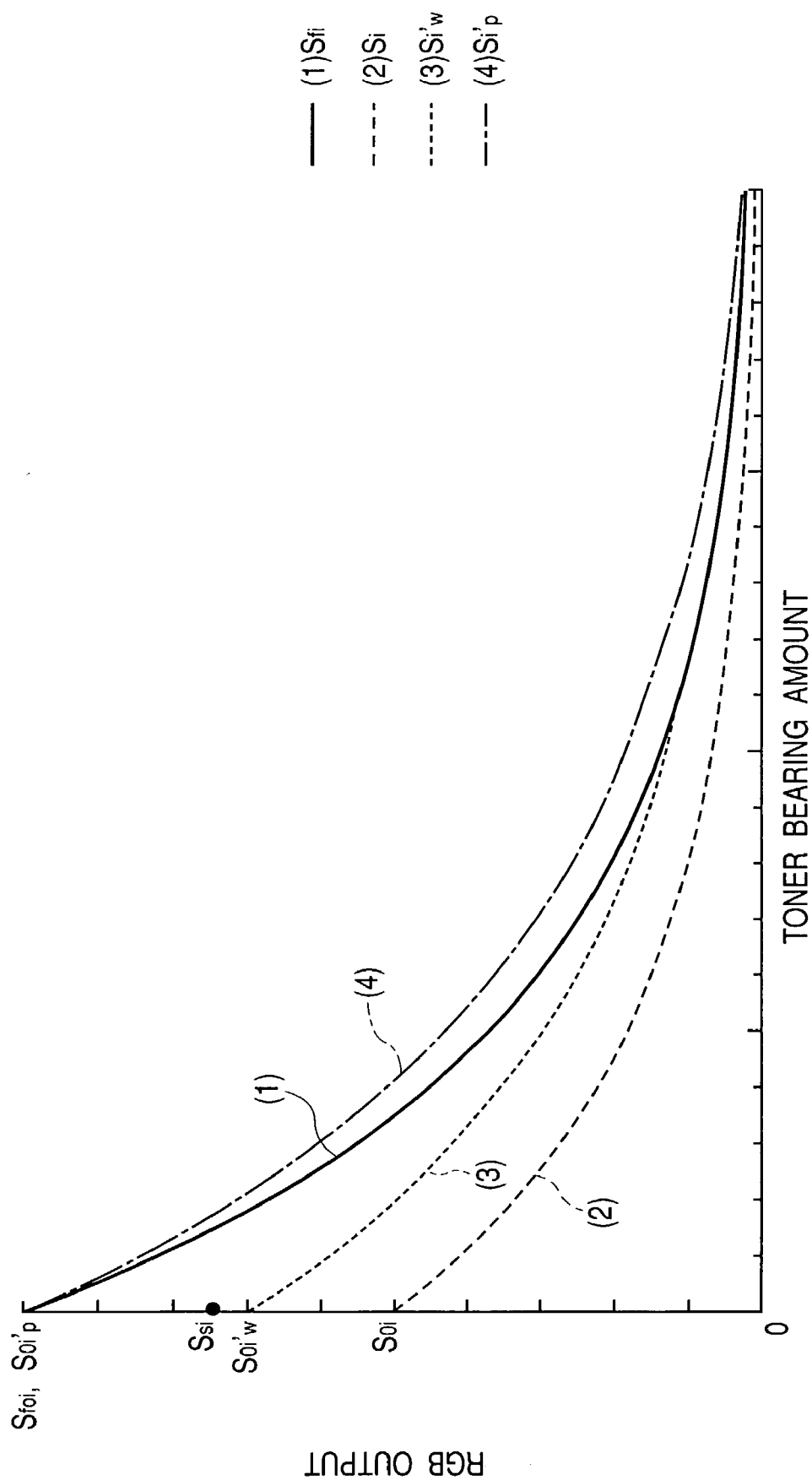
FIG. 16 is a graph showing the correction methods for RGB output values in the conventional example.

FIG. 13 is a graph showing the relationship between toner bearing amount and RGB output value in detection of n (n=5 in FIG. 13) KD patches.

The RGB output measured values $S_{dr}(n)$, $S_{dg}(n)$, and $S_{db}(n)$ (n=1,2, . . . ) are subjected to conversion similar to the conversion at S1105 described hereinafter, to calculate corrected values resulting from correction for the deviation of the color sensor output values due to the color sensor, i.e., $S_{dr'c}(n)$, $S_{dg'c}(n)$, and $S_{db'c}(n)$ (n=1, 2, . . . in decreasing order from the largest toner bearing amount) being output values of the respective colors R, G, and B of each KD patch resulting from the correction by the correction point C using the transferring material.

FIG. 13 shows plots of the output values $S_{dr'c}(n)$, $S_{dg'c}(n)$, and $S_{db'c}(n)$ (n=1, 2, . . . ) of the respective colors R, G, B of the KD patches resulting from the correction by the correction point C using the transferring material, which are corrected values after the correction for the deviation.

Then comparison is made between the ratio $S_{dr'c}(n):S_{dg'c}(n):S_{db'c}(n)$ and the ratio $S_{f0r}:S_{f0g}:S_{f0b}$ or between the ratio $S_{dr'c}(n):S_{dg'c}(n):S_{db'c}(n)$ and the ratio $S_{fcr}:S_{fcg}:S_{fcb}$ in order from n=1.

As the toner bearing amount decreases, i.e., as n increases, the transferring material 11 increases its influence.

Then preliminarily set is a boundary condition that the influence of the color of the transferring material 11 becomes unignorably large on the chromaticity of the patch.

For example, let us suppose $S_{f0r}:S_{f0g}:S_{f0b}=S_{fcr}:S_{fcg}:S_{fcb}=1:1:1$ (which is different from FIG. 13 and which is assumed for simplicity of description).

Then, it is determined that the influence of the transferring material 11 becomes unignorable when either $S_{dg'c}(n)/S_{dr'c}(n)$ or $S_{db'c}(n)/S_{dr'c}(n)$ is equal to or less than 1.1 or equal to or less than 0.9.

Then the turning point D is determined at a toner bearing amount of a KD patch one before a patch with which the comparison of the ratio of the two values results in exceeding the boundary condition (S1103).

Then $S_{di'c}(n)$ at the turning point D is defined as $S_{di'c}$.

The following will describe the correction for the RGB output values of the after-fixed density-gradation characteristic control patch pattern 63 detected by the color sensor 42.

First, S1104 is to detect the after-fixed density-gradation characteristic control patch pattern 63 by the color sensor 42 to obtain the RGB output value $S_i$.

Then S1105 is to perform calculation according to Eqn (7) below to obtain $S_{i'c}$:

$$S_{i'c}=S_i \times (S_{fci}/S_{ci}) \quad (i=r, g, \text{ or } b) \tag{7}$$

In this calculation, $S_i$ is multiplied by the coefficient for converting the RGB output value $S_{ci}$ upon detection of the KC patch into the RGB output theoretical value $S_{fci}$ at the RGB correction point.

Since the influence of the transferring material 11 is sufficiently small on the chromaticity of the after-fixed density-gradation characteristic control patch pattern 63 at the RGB correction point C, the deviation due to the secular change of the color sensor 42, the variation thereof, etc., can be corrected to some extent by uniformly performing the above operation for all of the RGB output values.

Next, S1106 is to perform comparison according to the following formula:

$$S_{i'c} > S_{di'c} \quad (i=r, g, \text{ or } b)$$

$S_{di'c}$: deviation-corrected value of the RGB output value $S_{di}$ at the turning point D determined previously (RGB output value resulting from the correction by the correction point C using the transferring material for the RGB output measured value $S_{di}$ at the determined turning point D).

When the above inequality is true, it is determined that the after-fixed density-gradation characteristic control patch pattern 63 is of the toner bearing amount smaller than that at the turning point D and that the influence of the color of the transferring material 11 is unignorable on the chromaticity of the after-fixed density-gradation characteristic control patch pattern 63; if it is false, it is determined that the toner bearing amount is larger than that at the turning point D and that the influence of the color of the transferring material 11 is ignorable on the chromaticity of the after-fixed density-gradation characteristic control patch pattern 63.

When the result of the comparison at S1106 is true, the flow goes to S1107; otherwise, the flow goes to S1108.

S1107 is to perform calculation according to Eqn (8) below to obtain the further corrected RGB output value $S_{i''cd}$ in Embodiment 3:

$$S_{i''cd}=(S_{i'c}-S_{di'c}) \times [(S_{f0i}-S_{di'c})/(S_{0i'c}-S_{di'c})]+S_{di'c} \quad (i=r, g, \text{ or } b) \tag{8}$$

In FIG. 12, only $S_{i'c}$ on the lower density side than the turning point D, after subtraction of $S_{di'c}$ from $S_{i'c}$, is uniformly multiplied by the coefficient for converting $S_{i'c}$ at the bearing amount of 0, i.e., $S_{0i'c}$ into $S_{f0i}$.

S1108 is to determine the further corrected RGB output value in Embodiment 3 according to $S_{i''cd}=S_{i'c}$.

The reason for this is that the chromaticity of the after-fixed density-gradation characteristic control patch pattern 63 is considered to be hardly affected by the transferring material 11 on the higher density side as compared with the turning point D.

Then, S1109 is to calculate $S_{i''cd}$ as the further corrected RGB output value in Embodiment 3.

It is seen from FIG. 12 that the further corrected RGB output value $S_{i''cd}$ in Embodiment 3 (curve (7)) is much closer to the RGB output theoretical value (curve (1)) than the RGB output value $S_{i'p}$ resulting from the correction by the conventional correction method assuming the transferring material as absolute white (curve (4)) and the RGB output value $S_{i'c}$ resulting from the correction by the correction point C using the transferring material (curve (3)').

Namely, the correction method of the present embodiment is able to eliminate the influence of the transferring material 11 more than the conventional correction method.

Accordingly, when the apparatus is configured so that the correction of the present embodiment is effected for all the RGB output values and so that the further corrected RGB output values in Embodiment 3 are applied to the subsequent feedback control to the image processing portion and to the image forming portion, it becomes feasible to carry out the control with better accuracy by the degree of determining the turning point D on the basis of the black (K) monochromatic patches (KD patches) actually formed on the transferring material 11, as compared with Embodiment 2, and to improve the color reproducibility of the color image forming apparatus.

Just as in the case of Embodiment 1 and Embodiment 2, however, the desired correction accuracy might not be achieved even by the correction according to the present embodiment when the transferring material 11 has very high chroma or low brightness.

The apparatus may also be configured to perform error detection so that when the after-fixed density-gradation characteristic control patch pattern 63 to be detected by the color sensor 42 is formed on such a transferring material 11, an error is determined to cancel the detection of the after-fixed density-gradation characteristic control patch pattern 63.

A method of error detection is as follows.

The RGB output value $S_{0i}$ of the transferring material 11 detected immediately before the correction is converted into $S_{0i'c}$, as at S1105.

Then $S_{0i'c}$ is compared with the sensor output theoretical value $S_{f0i}$ at the toner bearing amount of 0, for each of RGB.

When the result of the comparison is that the two values are largely different, an error is determined based on the judgment that the transferring material 11 has too high chroma or too low brightness to implement the control with satisfactory accuracy even with formation of the after-fixed density-gradation characteristic control patch pattern 63.

A criterion to determine an error, for example, an error is determined when $S_{0i'c}/S_{f0i}$ is equal to or less than 0.7, is preliminarily set.

The present embodiment described the relationship between toner bearing amount and RGB output value, assuming the color image forming apparatus of the electrophotographic system, but much the same as the present embodiment can also be applied to the color image forming apparatus of the ink jet system and the like, by replacing the toner bearing amount with the area gradient and employing the relationship between area gradient and RGB output value.

As described above, the invention succeeded in providing the correction method for the color sensor output values in the color image forming apparatus with improvement in the color reproducibility of the color image forming apparatus, and providing the color image forming apparatus.

What is claimed is:

1. A method of making correction for color sensor output values in color image forming apparatus having a color sensor to detect a color of patch formed on a transferring material by an image forming apparatus, said method comprising:
   a detecting step for detecting a patch formed on the transferring material and a transferring material by a color;
   a comparing step for making comparison between an output value obtained for the patch in said detecting step and a value at a boundary point in which a color of a transferring material affects a chromaticity of a patch;
   a correction step for, in the result of the comparison in said comparing step, in a case where a density of the output value for the patch is lower than the value at a boundary point, eliminating a value corresponding to an influence due to the transferring material from the output value of the color sensor for the patch,
   wherein said correction step is not executed in a case where a density of the output value for the patch is higher than the value at a boundary point.

2. The method according to claim 1, wherein said correction step includes a step of multiplying a light amount exceeding the boundary by a coefficient to eliminate the influence due to the transferring material from the output value of the color sensor.

3. The method according to claim 1, further comprising a step of, prior to said comparing step of eliminating deviation due to characteristic of the color sensor to correct the output value of the color sensor.

4. The method according to claim 1, wherein the image forming apparatus includes an absolute white reference board, and said method further comprises a characteristic obtaining step for obtaining information regarding characteristic of the color sensor by the output value of the color sensor in a case where the color sensor detects the absolute white reference board and a theoretical value of an output obtained from light emitting and receiving characteristics of the color sensor for a patch whose density is zero.

5. The method according to claim 3, further comprising a step of obtaining information regarding the characteristic of the color sensor by the output value of the color sensor in a case where a signal black color patch whose density is higher than a density at the boundary point is detected and a theoretical value of an output obtained from light emitting and receiving characteristics of the color sensor for the single black color patch.

6. The method according to claim 1, wherein the boundary point is determined by the light and receiving characteristics of the color sensor.

7. The method according to claim 1, further comprising a step for determining the boundary point by forming a plurality of single black color patches whose densities are respectively different, and comparing a corrected value in which deviation due to the characteristic of the color sensor is eliminated from the output value of the color sensor for the patch with a theoretical value obtained from light emitting and receiving characteristics of the color sensor and characteristics of toner used for an image forming.

8. The method according to claim 1, wherein the color sensor includes white light emitting means and light receiving means having on chip filters for colors more than three different colors.

9. The method according to claim 1 wherein the color sensor includes light receiving means and light emitting means for colors more than three different colors.

10. The method according to claim 1, wherein the color sensor is provided at a portion where a transferring material after a fixing processing is detectable in a transferring material conveyance path in the image forming apparatus.

11. An image forming apparatus, comprising:
    an image forming portion on which an image is formed on a transferring material;
    a color sensor which receives a light amount from a patch formed on the transferring material and the transferring material, the color sensor being provided in said image forming apparatus to detect a color of the patch formed on the transferring material by said image forming portion; and
    correction means which make comparison between an output value obtained for the patch by said color sensor and a value at a boundary point in which a color of transferring material affects a chromaticity of a patch, and in the result of the comparison, in a case where a density of the output value for the patch is lower than the value at a boundary point, eliminates a value corresponding to an influence due to the transferring material from the output value of the color sensor for the patch,
    wherein, in a case where a density of the output value for the patch is higher than the value at a boundary point, said correction means do not eliminate a value corresponding to an influence due to the transferring material from the output value of the color sensor for the patch.

* * * * *

UNITED STATES PATENT AND TRADEMARK OFFICE
CERTIFICATE OF CORRECTION

| | | |
|---|---|---|
| PATENT NO. | : 7,239,427 B2 | |
| APPLICATION NO. | : 10/285566 | |
| DATED | : July 3, 2007 | |
| INVENTOR(S) | : Hiroki Tezuka et al. | |

It is certified that error appears in the above-identified patent and that said Letters Patent is hereby corrected as shown below:

ON THE TITLE PAGE, IN REFERENCES CITED (56):

In FPD, "1199884 A" should read --1 199 884 A--; and
"01/06757 A1" should read --WO 01/06757 A1--.

ON DRAWING SHEET 7:

In FIGURE 9, "FARTHER" should read --FURTHER--. As shown in attached page.

COLUMN 1:

Line 58, "tp" should read --to--.

COLUMN 2:

Line 10, "aromatic" should read --achromatic--.

COLUMN 4:

Line 49, "correction" should read --corrected--.

COLUMN 10:

Line 21, "contain respective" should read --contain--.

UNITED STATES PATENT AND TRADEMARK OFFICE
CERTIFICATE OF CORRECTION

PATENT NO. : 7,239,427 B2
APPLICATION NO. : 10/285566
DATED : July 3, 2007
INVENTOR(S) : Hiroki Tezuka et al.

It is certified that error appears in the above-identified patent and that said Letters Patent is hereby corrected as shown below:

<u>COLUMN 24:</u>

Line 6, "light" should read --light-emitting--; and
Line 21, "claim 1" should read --claim 1,--.

Signed and Sealed this

Twelfth Day of August, 2008

JON W. DUDAS
*Director of the United States Patent and Trademark Office*